(12) United States Patent
Billuri et al.

(10) Patent No.: US 12,010,029 B2
(45) Date of Patent: Jun. 11, 2024

(54) TECHNIQUES FOR PRIORITIZING SERVICE FLOW TO MAINTAIN QUALITY OF SERVICE

(71) Applicant: QUALCOMM Incorporated, San Diego, CA (US)

(72) Inventors: Krishna Chitanya Billuri, San Diego, CA (US); Rajashekar Chilla, San Diego, CA (US); Neel Vikramkumar Shah, San Diego, CA (US); Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/520,340

(22) Filed: Nov. 5, 2021

(65) Prior Publication Data

US 2022/0150173 A1 May 12, 2022

Related U.S. Application Data

(60) Provisional application No. 63/112,105, filed on Nov. 10, 2020.

(51) Int. Cl.
*H04L 47/2425* (2022.01)
*H04L 47/2416* (2022.01)
*H04W 28/02* (2009.01)

(52) U.S. Cl.
CPC ...... *H04L 47/2433* (2013.01); *H04L 47/2416* (2013.01); *H04W 28/0257* (2013.01); *H04W 28/0268* (2013.01)

(58) Field of Classification Search
CPC . H04L 47/2433; H04L 47/2416; H04L 47/24; H04L 28/0257; H04L 28/0268;
(Continued)

(56) References Cited

U.S. PATENT DOCUMENTS

| 2005/0047363 A1* | 3/2005 | Jiang | H04W 76/15 370/328 |
| 2005/0282555 A1* | 12/2005 | Swetina | H04N 21/6131 455/454 |

(Continued)

OTHER PUBLICATIONS

International Search Report and Written Opinion—PCT/US2021/058396—ISA/EPO—dated Feb. 25, 2022.

*Primary Examiner* — Nam T Tran
(74) *Attorney, Agent, or Firm* — Dalei Dong; Holland & Hart LLP

(57) ABSTRACT

Methods, systems, and devices for wireless communications are described. In some systems, a modem of a user equipment (UE) and a data source, such as an application processor or a tethered client, may support for flow control enforcement per service flow. For example, the modem may transmit, to the application processor, a first flow control command for a first data traffic including non-prioritized data. The application processor, based on the first flow control command, may transmit, to the modem, the first data traffic including the non-prioritized data according to the first flow control command while also transmitting a second data traffic including prioritized data without flow control. The modem and the application processor may support such selective flow control enforcement based on a priority of a service flow based on maintaining multiple buffers at the modem or based on defining multiple thresholds of one buffer associated with triggering flow control.

30 Claims, 13 Drawing Sheets

(58) Field of Classification Search
CPC .............. H04L 28/02; H04W 28/0257; H04W 28/0268
See application file for complete search history.

(56) References Cited

U.S. PATENT DOCUMENTS

| | | | |
|---|---|---|---|
| 2010/0315948 A1* | 12/2010 | Yi ..................... | H04W 28/0284 370/235 |
| 2016/0182383 A1* | 6/2016 | Pedersen ................ | H04L 45/24 709/226 |
| 2017/0070435 A1* | 3/2017 | Marco ............... | H04W 28/0247 |
| 2018/0176816 A1* | 6/2018 | Meylan ............. | H04W 28/0268 |
| 2018/0176818 A1* | 6/2018 | Parron .............. | H04W 28/0278 |
| 2020/0145881 A1* | 5/2020 | Mitra ................ | H04W 28/0278 |
| 2021/0397364 A1* | 12/2021 | Cho ........................ | G06F 3/064 |
| 2021/0410129 A1* | 12/2021 | Freda .................. | H04W 72/543 |
| 2022/0070722 A1* | 3/2022 | Wang ............... | H04W 28/0289 |
| 2022/0279381 A1* | 9/2022 | Yao ....................... | H04W 28/06 |
| 2023/0254846 A1* | 8/2023 | Yang .................. | H04W 72/566 370/329 |

\* cited by examiner

TECHNIQUES FOR PRIORITIZING SERVICE FLOW TO MAINTAIN QUALITY OF SERVICE

CROSS REFERENCE

The present Application for Patent claims the benefit of U.S. Provisional Patent Application No. 63/112,105 by YUNUSOV Billuri et al., entitled "TECHNIQUES FOR PRIORITIZING SERVICE FLOW TO MAINTAIN QUALITY OF SERVICE," filed Nov. 10, 2020, assigned to the assignee hereof, which is hereby incorporated by reference in its entirety.

FIELD OF DISCLOSURE

The following relates to wireless communications, including techniques for prioritizing service flow to maintain quality of service.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE, or a modem of a UE, may receive an uplink grant for an uplink transmission of data to a network device. In some cases, however, the uplink grant may be insufficient to accommodate a data rate of the UE.

SUMMARY

The described techniques relate to improved methods, systems, devices, and apparatuses that support techniques for prioritizing service flow to maintain quality of service (QoS). A user equipment (UE), or a modem of a UE, may receive data from an application processor for uplink transmission to a network device. The data from the application processor may be associated with a variety of different service types or QoS constraints and, in some examples, the modem or the application processor, or both, may partition the data into two or more different traffic types based on a priority of the data. For example, the modem or the application processor, or both, may partition the data into a first data traffic associated with a first and lower priority level and a second data traffic associated with a second and higher priority level. As such, the modem and the application processor may implement selective flow control enforcement per data traffic type (e.g., per service flow identifier) to exclude some data traffic (e.g., such as the second data traffic associated with the higher priority level) from the flow control enforcement.

For instance, in examples in which the modem or the application processor, or both, partition data traffic into the first data traffic associated with the lower priority level and the second data traffic associated with the higher priority level, the modem and the application processor may support two different flow control commands such that a first flow control command applies for the first data traffic (e.g., and not the second data traffic) and a second flow control command applies for the second data traffic (e.g., and not the first data traffic). In such examples, if the modem receives insufficient uplink grants such that an amount of data that is stored in one or more buffers of the modem accumulates (e.g., accumulates towards filling the one or more buffers of the modem), the modem may transmit the first flow control command to the application processor to control the flow of the first data traffic while allowing the second data traffic to continue without flow control. If the flow conditions at the modem do not improve based on the first flow control command for the first data traffic, the modem may transmit the second flow control command to the application processor to control the flow of the second data traffic.

The modem and the application processor may implement various techniques to achieve such per-data traffic type flow control enforcement. In some implementations, for example, the modem may support two buffers including a first buffer for the first data traffic and a second buffer for the second data traffic, where the two buffers may each include a threshold level such that if the amount of data in a buffer exceeds the threshold of the buffer, the modem transmits a flow control command for the data traffic stored in that buffer. For example, if the amount of the first data traffic stored in the first buffer exceeds the threshold of the first buffer, the modem may transmit the first flow control command to the application processor for the first data traffic. Similarly, if the amount of the second data traffic stored in the second buffer exceeds the threshold of the second buffer, the modem may transmit the second flow control command to the application processor for the second data traffic. In some other implementations, the modem may support one buffer including both the first data traffic and the second data traffic and may define multiple thresholds. For example, the modem may define multiple thresholds such that if an amount of the first data traffic and the second data traffic in the one buffer exceeds a first and lower threshold, the modem may transmit the first flow control command to the application processor for the first data traffic. If the amount of the first data traffic and the second data traffic continues to rise (e.g., after applying the first flow control command) and if the amount of the first data traffic and the second data traffic exceeds a second and higher threshold, the modem may transmit the second flow control command to the application processor for the second data traffic.

A method for wireless communication at a first device is described. The method may include receiving, from a second device, a first data traffic having a first QoS and a first priority level, receiving, from the second device, a second data traffic having a second QoS and a second priority level greater than the first priority level, where the first data traffic and the second data traffic are for a same radio bearer, storing the first data traffic and the second data traffic in one or more buffers of the first device, and transmitting, to the second device, a first flow control command for the first data traffic based on the first priority level associated with the first data traffic being less than the second priority level and further based on a threshold level of a buffer of the one or more buffers.

An apparatus for wireless communication at a first device is described. The apparatus may include a processor, memory in electronic communication with the processor, and instructions stored in the memory. The instructions may be executable by the processor to cause the apparatus to receive, from a second device, a first data traffic having a first QoS and a first priority level, receive, from the second device, a second data traffic having a second QoS and a second priority level greater than the first priority level, where the first data traffic and the second data traffic are for a same radio bearer, store the first data traffic and the second data traffic in one or more buffers of the first device, and transmit, to the second device, a first flow control command for the first data traffic based on the first priority level associated with the first data traffic being less than the second priority level and further based on a threshold level of a buffer of the one or more buffers.

Another apparatus for wireless communication at a first device is described. The apparatus may include means for receiving, from a second device, a first data traffic having a first QoS and a first priority level, means for receiving, from the second device, a second data traffic having a second QoS and a second priority level greater than the first priority level, where the first data traffic and the second data traffic are for a same radio bearer, means for storing the first data traffic and the second data traffic in one or more buffers of the first device, and means for transmitting, to the second device, a first flow control command for the first data traffic based on the first priority level associated with the first data traffic being less than the second priority level and further based on a threshold level of a buffer of the one or more buffers.

A non-transitory computer-readable medium storing code for wireless communication at a first device is described. The code may include instructions executable by a processor to receive, from a second device, a first data traffic having a first QoS and a first priority level, receive, from the second device, a second data traffic having a second QoS and a second priority level greater than the first priority level, where the first data traffic and the second data traffic are for a same radio bearer, store the first data traffic and the second data traffic in one or more buffers of the first device, and transmit, to the second device, a first flow control command for the first data traffic based on the first priority level associated with the first data traffic being less than the second priority level and further based on a threshold level of a buffer of the one or more buffers.

In some examples of the method, apparatuses, and non-transitory computer-readable medium described herein, storing the first data traffic and the second data traffic in the one or more buffers of the first device may include operations, features, means, or instructions for storing the first data traffic in a first buffer of the first device and the second data traffic in a second buffer of the first device, where the first buffer and the second buffer may be linked to a same data radio bearer (DRB), and where and each of the first buffer and the second buffer include a set of multiple threshold levels that may be each configured based on the first priority level and the second priority level.

In some examples of the method, apparatuses, and non-transitory computer-readable medium described herein, transmitting the first flow control command for the first data traffic may include operations, features, means, or instructions for transmitting the first flow control command for the first data traffic based on a first amount of the first data traffic stored in the first buffer being greater than a first threshold level of the first buffer.

Some examples of the method, apparatuses, and non-transitory computer-readable medium described herein may further include operations, features, means, or instructions for transmitting, to the second device, a second flow control command for the second data traffic based on a second amount of the second data traffic stored in the second buffer being greater than a second threshold level of the second buffer.

In some examples of the method, apparatuses, and non-transitory computer-readable medium described herein, storing the first data traffic and the second data traffic in the one or more buffers of the first device may include operations, features, means, or instructions for storing the first data traffic and the second data traffic in one buffer of the first device, the one buffer including a set of multiple threshold levels, where each threshold level of the set of multiple threshold levels may be configured based on the first priority level and the second priority level.

In some examples of the method, apparatuses, and non-transitory computer-readable medium described herein, transmitting the first flow control command for the first data traffic may include operations, features, means, or instructions for transmitting the first flow control command for the first data traffic based on a first amount of the first data traffic and the second data traffic stored in the one buffer being greater than a first threshold level of the one buffer, where the first threshold level may be associated with triggering the first flow control command for the first data traffic.

Some examples of the method, apparatuses, and non-transitory computer-readable medium described herein may further include operations, features, means, or instructions for transmitting, to the second device, an indication to enable flow for the first data traffic based on the first amount of the first data traffic and the second data traffic stored in the one buffer being less than a second threshold level of the one buffer, where the second threshold level may be associated with triggering the indication to enable flow for the first data traffic.

Some examples of the method, apparatuses, and non-transitory computer-readable medium described herein may further include operations, features, means, or instructions for transmitting, to the second device, a second flow control command for the second data traffic based on a first amount of the first data traffic and the second data traffic stored in the one buffer being greater than a first threshold level of the one buffer, where the first threshold level may be associated with triggering the second flow control command for the second data traffic.

Some examples of the method, apparatuses, and non-transitory computer-readable medium described herein may further include operations, features, means, or instructions for transmitting, to the second device, an indication to enable flow for the second data traffic based on the first amount of the first data traffic and the second data traffic stored in the one buffer being less than a second threshold level of the one buffer, where the second threshold level may be associated with triggering the indication to enable flow for the second data traffic.

In some examples of the method, apparatuses, and non-transitory computer-readable medium described herein, the set of multiple threshold levels include at least a first threshold level triggering transmission of the first flow control command for the first data traffic and a second threshold level triggering transmission of a second flow control command for the second data traffic, the first threshold level being less than the second threshold level.

In some examples of the method, apparatuses, and non-transitory computer-readable medium described herein, transmitting the first flow control command for the first data traffic may include operations, features, means, or instructions for transmitting the first flow control command based on a first amount of the first data traffic and the second data traffic stored in the one or more buffers being greater than a threshold level of the one or more buffers.

Some examples of the method, apparatuses, and non-transitory computer-readable medium described herein may further include operations, features, means, or instructions for receiving, from the second device, the second data traffic based on an exception of the second data traffic from the first flow control command, storing the second data traffic in the one or more buffers between the threshold level and an upper limit threshold level, and transmitting, to the second device, a second flow control command including an indication to stop transmitting the second data traffic based on a second amount of the second data traffic stored in the one or more buffers being equal to or greater than the upper limit threshold level.

Some examples of the method, apparatuses, and non-transitory computer-readable medium described herein may further include operations, features, means, or instructions for receiving, from a network device, one or more uplink grants for uplink transmission of the first data traffic and the second data traffic to the network device, where a size of a cumulation of the one or more uplink grants may be less than a threshold size, the threshold size being a minimum size to concurrently carry both the first data traffic and the second data traffic without triggering a flow control command.

In some examples of the method, apparatuses, and non-transitory computer-readable medium described herein, the second data traffic may have the second QoS based on a service level agreement (SLA) associated with the second data traffic.

In some examples of the method, apparatuses, and non-transitory computer-readable medium described herein, the first data traffic and the second data traffic may be associated with different differentiated services code point (DSCP) classes.

In some examples of the method, apparatuses, and non-transitory computer-readable medium described herein, the first device may be a modem of a user equipment (UE) and the second device may be an application processor or a tethered client tethered to the first device via an ethernet connection, a universal serial bus (USB) connection, a peripheral component interconnect express (PCIe) connection, or a wireless fidelity (Wi-Fi) connection.

A method for wireless communication at a second device is described. The method may include transmitting, to a first device, a first data traffic having a first QoS and a first priority level, transmitting, to the first device, a second data traffic having a second QoS and a second priority level greater than the first priority level, where the first data traffic and the second data traffic are for a same radio bearer, receiving, from the first device, a first flow control command for the first data traffic based on the first priority level associated with the first data traffic being less than the second priority level and further based on a threshold level of a buffer of the one or more buffers, and transmitting, to the first device, the first data traffic and the second data traffic, the first data traffic transmitted according to the first flow control command.

An apparatus for wireless communication at a second device is described. The apparatus may include a processor, memory in electronic communication with the processor, and instructions stored in the memory. The instructions may be executable by the processor to cause the apparatus to transmit, to a first device, a first data traffic having a first QoS and a first priority level, transmit, to the first device, a second data traffic having a second QoS and a second priority level greater than the first priority level, where the first data traffic and the second data traffic are for a same radio bearer, receive, from the first device, a first flow control command for the first data traffic based on the first priority level associated with the first data traffic being less than the second priority level and further based on a threshold level of a buffer of the one or more buffers, and transmit, to the first device, the first data traffic and the second data traffic, the first data traffic transmitted according to the first flow control command.

Another apparatus for wireless communication at a second device is described. The apparatus may include means for transmitting, to a first device, a first data traffic having a first QoS and a first priority level, means for transmitting, to the first device, a second data traffic having a second QoS and a second priority level greater than the first priority level, where the first data traffic and the second data traffic are for a same radio bearer, means for receiving, from the first device, a first flow control command for the first data traffic based on the first priority level associated with the first data traffic being less than the second priority level and further based on a threshold level of a buffer of the one or more buffers, and means for transmitting, to the first device, the first data traffic and the second data traffic, the first data traffic transmitted according to the first flow control command.

A non-transitory computer-readable medium storing code for wireless communication at a second device is described. The code may include instructions executable by a processor to transmit, to a first device, a first data traffic having a first QoS and a first priority level, transmit, to the first device, a second data traffic having a second QoS and a second priority level greater than the first priority level, where the first data traffic and the second data traffic are for a same radio bearer, receive, from the first device, a first flow control command for the first data traffic based on the first priority level associated with the first data traffic being less than the second priority level and further based on a threshold level of a buffer of the one or more buffers, and transmit, to the first device, the first data traffic and the second data traffic, the first data traffic transmitted according to the first flow control command.

In some examples of the method, apparatuses, and non-transitory computer-readable medium described herein, receiving the first flow control command for the first data traffic may include operations, features, means, or instructions for receiving the first flow control command for the first data traffic based on a first amount of the first data traffic stored in a first buffer associated with the first data traffic being greater than a first threshold level of the first buffer.

Some examples of the method, apparatuses, and non-transitory computer-readable medium described herein may further include operations, features, means, or instructions for receiving, from the first device, a second flow control command for the second data traffic based on a second amount of the second data traffic stored in a second buffer associated with the second data traffic being greater than a second threshold level of the second buffer, the second buffer being different from the first buffer.

In some examples of the method, apparatuses, and non-transitory computer-readable medium described herein, transmitting the first data traffic and the second data traffic may include operations, features, means, or instructions for transmitting, from the second device to the first device via a first interface, the first data traffic according to the first flow control command and transmitting, from the second device to the first device via a second interface, the second data traffic according to the second flow control command.

In some examples of the method, apparatuses, and non-transitory computer-readable medium described herein, transmitting the first data traffic and the second data traffic may include operations, features, means, or instructions for transmitting, from the second device, the first data traffic according to a first traffic shaping based on the first flow control command and transmitting, from the second device, the second data traffic according to a second traffic shaping based on the second flow control command.

In some examples of the method, apparatuses, and non-transitory computer-readable medium described herein, receiving the first flow control command for the first data traffic may include operations, features, means, or instructions for receiving the first flow control command for the first data traffic based on a first amount of the first data traffic and the second data traffic stored in one buffer of the first device being greater than a first threshold level of the one buffer, where the first threshold level of the one buffer may be associated with triggering the first flow control command for the first data traffic.

Some examples of the method, apparatuses, and non-transitory computer-readable medium described herein may further include operations, features, means, or instructions for receiving, from the first device, an indication to enable flow for the first data traffic based on the first amount of the first data traffic and the second data traffic stored in the one buffer being less than a second threshold level of the one buffer, where the second threshold level of the one buffer may be associated with triggering the indication to enable flow for the first data traffic.

Some examples of the method, apparatuses, and non-transitory computer-readable medium described herein may further include operations, features, means, or instructions for receiving, from the first device, a second flow control command for the second data traffic based on a first amount of the first data traffic and the second data traffic stored in one buffer of the first device being greater than a first threshold level of the one buffer, where the first threshold level of the one buffer may be associated with triggering the second flow control command for the second data traffic.

Some examples of the method, apparatuses, and non-transitory computer-readable medium described herein may further include operations, features, means, or instructions for receiving, from the first device, an indication to enable flow for the second data traffic based on the first amount of the first data traffic and the second data traffic stored in the one buffer being less than a second threshold level of the one buffer, where the second threshold level of the one buffer may be associated with triggering the indication to enable flow for the second data traffic.

In some examples of the method, apparatuses, and non-transitory computer-readable medium described herein, receiving the first flow control command may include operations, features, means, or instructions for receiving the first flow control command indicating that a first amount of the first data traffic and the second data traffic stored in the one or more buffers of the first device may be greater than a threshold level of the one or more buffers.

Some examples of the method, apparatuses, and non-transitory computer-readable medium described herein may further include operations, features, means, or instructions for transmitting, to the first device, the second data traffic based on an exception of the second data traffic from the first flow control command and receiving, from the first device, a second flow control command including an indication to stop transmitting the second data traffic based on a second amount of the second data traffic stored in the one or more buffers being equal to or greater than an upper limit threshold level of the one buffer.

Some examples of the method, apparatuses, and non-transitory computer-readable medium described herein may further include operations, features, means, or instructions for receiving an indication that a size of a cumulation of one or more uplink grants for uplink transmission of the first data traffic and the second data traffic may be less than a threshold size, the threshold size being a minimum size to concurrently carry both the first data traffic and the second data traffic without triggering a flow control command.

In some examples of the method, apparatuses, and non-transitory computer-readable medium described herein, receiving the indication that the size of the cumulation of the one or more uplink grants for the uplink transmission may be less than the threshold size may include operations, features, means, or instructions for receiving the indication that the one or more uplink grants may be not available for the uplink transmission of the first data traffic and the second data traffic.

Some examples of the method, apparatuses, and non-transitory computer-readable medium described herein may further include operations, features, means, or instructions for receiving a second indication that the one or more uplink grants may be available for the uplink transmission of the first data traffic and the second data traffic, where transmitting the first data traffic and the second data traffic to the first device may include operations, features, means, or instructions for transmitting the second data traffic prior to transmitting the first data traffic.

In some examples of the method, apparatuses, and non-transitory computer-readable medium described herein, the second data traffic may have the second QoS based on an SLA associated with the second data traffic.

In some examples of the method, apparatuses, and non-transitory computer-readable medium described herein, the first data traffic and the second data traffic may be associated with different DSCP classes.

In some examples of the method, apparatuses, and non-transitory computer-readable medium described herein, the first device may be a modem of a UE and the second device may be an application processor or a tethered client tethered to the first device via an ethernet connection, a USB connection, a PCIe connection, or a Wi-Fi connection.

DETAILED DESCRIPTION

Figure 1:
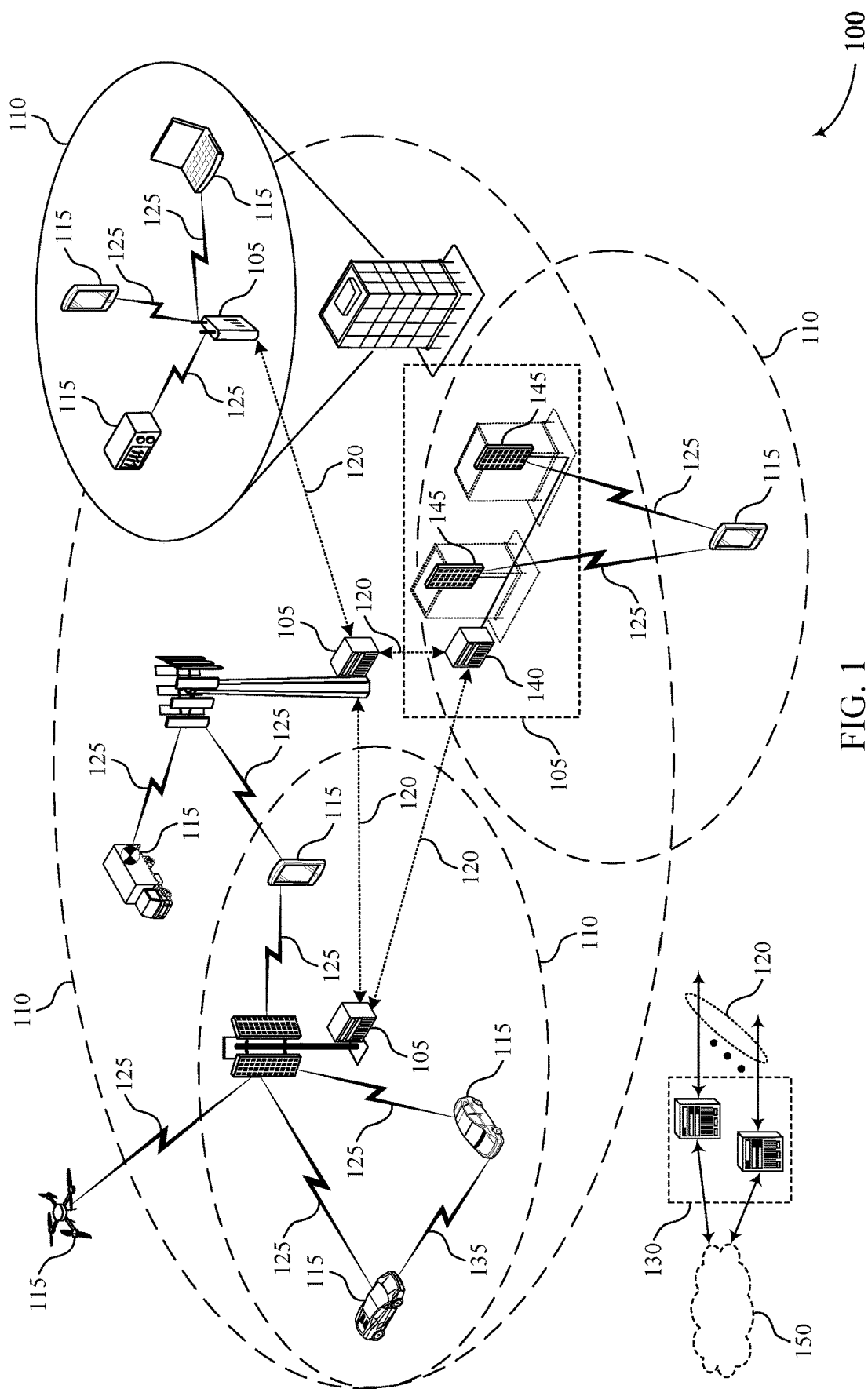
FIGS. 1 and 2 illustrate examples of wireless communications systems that support techniques for prioritizing service flow to maintain QoS in accordance with various aspects of the present disclosure.

As demand for communication resources increases due to an increasing number of wireless devices communicating over the available spectrum, techniques to efficiently and reliably increase throughput are increasingly desirable. Further, and based on the increasing number of wireless devices communicating over the available spectrum, maintaining best effort and prioritized data services has become challenging. For example, with more devices requesting communication resources over the available spectrum, network devices may be unable to provide a device with a bandwidth over which the device may concurrently transmit data of different data services while maintaining a quality of service (QoS) defined in a service level agreement (SLA). For instance, if the device is transmitting default data (e.g., non-prioritized data) and prioritized data associated with an SLA concurrently and if the bandwidth grant provided to the device is insufficient to process the data (e.g., meet a data rate of a transmitter of the device), the device may flow control both the default data and the prioritized data due to the flow control being a bearer level functionality, which may introduce latency for the prioritized data (and risk breaking the SLA).

In some implementations of the present disclosure, the device, which may function as a modem of a user equipment (UE), may employ selective flow control enforcement per service flow identifier (e.g., per type of traffic, such as default or prioritized) to exclude some service flows (e.g., prioritized service flows or data traffic) from a flow control command to maintain or improve the QoS of prioritized data (e.g., the data associated with the SLA) in various network conditions. For example, a modem implementing the present disclosure may enforce flow control on a per-flow basis (such as per prioritized or non-prioritized flow) rather than at the bearer level. As such, the modem may provide a data source, such as an application processor, with separate flow control commands per service flow. For instance, in examples in which the modem and the application processor identify two service flows including a prioritized service flow (which may be equivalently referred to herein as prioritized data traffic) and a non-prioritized service flow (which may be equivalently referred to herein as non-prioritized data traffic), the modem may separately provide a different flow control command for each of the prioritized service flow and the non-prioritized service flow. The modem and the application processor may implement such flow control on a per prioritized or non-prioritized flow basis according to various techniques, as described in more detail herein.

Aspects of the subject matter described in this disclosure can be implemented to realize one or more of the following potential advantages. For example, the described techniques may be implemented to maintain the QoS of prioritized data in various network conditions based on employing flow control on a per service flow level rather than at the bearer level. As such, the modem may support unrestrained flow of relatively higher priority data while flow controlling relatively lower priority data, which may satisfy an SLA associated with the relatively higher priority data in various network conditions, including sub-optimal or poor network conditions or in scenarios in which the modem has a relatively small bandwidth for uplink transmission.

Aspects of the disclosure are initially described in the context of wireless communications systems. Aspects are additionally illustrated by and described with reference to data flow diagrams and a process flow. Aspects of the disclosure are further illustrated by and described with reference to apparatus diagrams, system diagrams, and flowcharts that relate to techniques for prioritizing service flow to maintain quality of service.

FIG. 1 illustrates an example of a wireless communications system 100 that supports techniques for prioritizing service flow to maintain QoS in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some examples, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, a UE 115 may include or function as a modem that can transmit data (e.g., data from an application processor or any other devices tethered to the UE 115) to a network device. The data may be or include IP flows or QoS flows and the data may be associated with various priority levels. For example, the data may include a first data traffic (e.g., a first IP flow or a first QoS flow) having a first and lower priority level and a second data traffic (e.g., a second IP flow or a second QoS flow) having a second and higher priority level. Accordingly, in some aspects, the first data traffic may be referred to herein as non-prioritized data and the second data traffic may be referred to herein as prioritized data.

The modem may receive one or more uplink grants from the network device over which to transmit the data to the network device. In some cases, however, a size of the one or more uplink grants (e.g., a size of a cumulation of the one or more uplink grants) may be insufficient to carry the data from the modem at a data rate of the modem (e.g., at the data rate of transmitter of the modem). For example, the modem may attempt to transmit the non-prioritized data at a first data rate higher than a second data rate supported by the one or more uplink grants provided to the modem. In such examples, the modem may lower the data rate of the transmitter of the non-prioritized data to be lower than the second data rate supported by the one or more uplink grants to avoid packet loss (e.g., which may otherwise occur if the modem transmits at a higher data rate than the data rate supported by the one or more uplink grants). In some cases, the modem may transmit a flow control command to the application processor to lower the data rate of the data queued for transmission from the modem. In some cases, however, the flow control command, based on being a bearer level functionality, may apply to both the non-prioritized data and the prioritized data, which may risk failing to maintain the QoS of the prioritized data.

In some implementations of the present disclosure, the modem may employ selective flow control enforcement per service flow identifier (e.g., per traffic flow, per IP flow, per QoS flow, etc.) to exclude some service flows (e.g., prioritized data) from a flow control command to maintain or improve the QoS of the prioritized data. For example, the modem may enforce flow control on a per-flow basis (such as per prioritized or non-prioritized flow) rather than at the bearer level. As such, the modem may provide a data source, such as the application processor, with separate flow control commands per service flow. For instance, in examples in which the modem and the application processor identify two service flows including the non-prioritized data and the prioritized data, the modem may separately provide a different flow control command for each of the non-prioritized data and the prioritized data. The modem and the application processor may implement such flow control on a per prioritized or non-prioritized flow basis according to various techniques, as described in more detail herein, including with reference to FIGS. 3-5.

Figure 2:
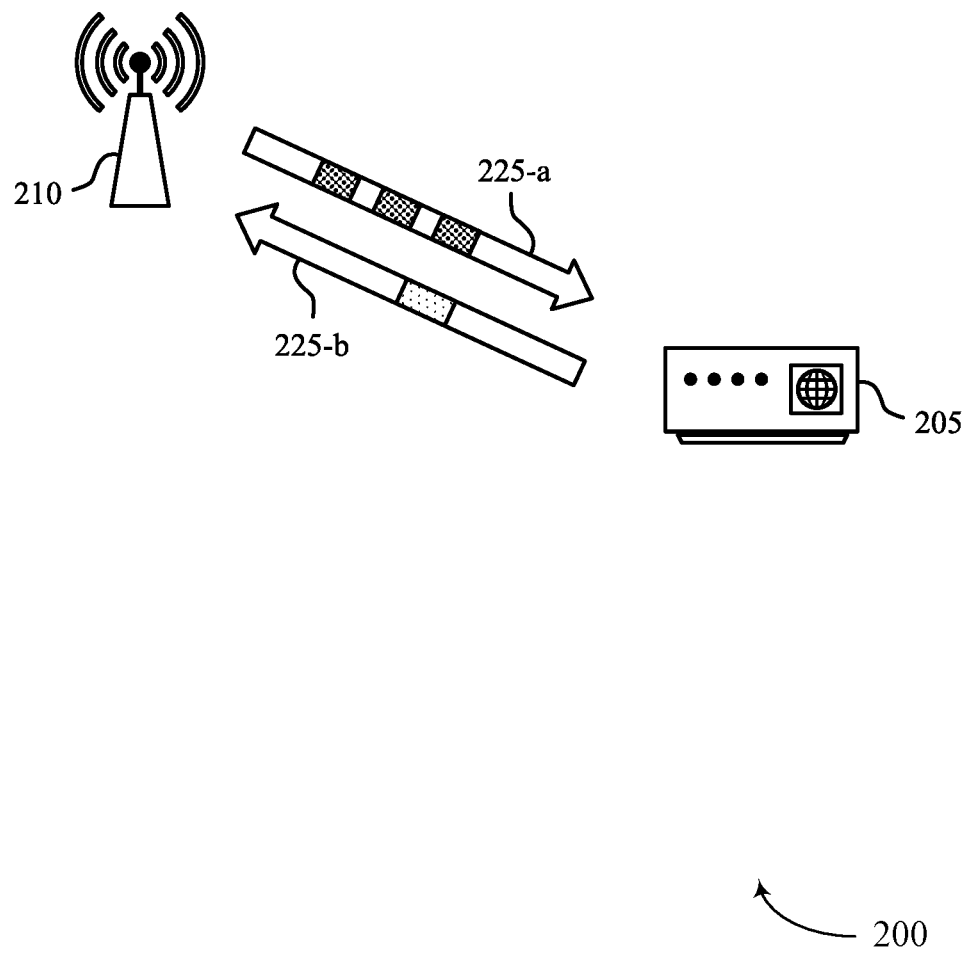

FIG. 2 illustrates an example of a wireless communications system 200 that supports techniques for prioritizing service flow to maintain QoS in accordance with various aspects of the present disclosure. In some examples, the wireless communications system 200 may implement aspects of the wireless communications system 100. The wireless communications system 200 illustrates communication between a modem 205 (e.g., a modem 205 of a UE) and a network device 210 (e.g., a base station, an access point, or a TRP, among other examples), which may be examples of corresponding devices described herein. In some examples, the modem 205 may transmit, to an application processor, separate flow control commands for different service flows (e.g., different IP flows or QoS flows) having different priority levels to maintain a QoS of prioritized data in various network conditions.

The modem 205 may communicate with the network device 210 over a communication link 225, including via downlink over a communication link 225-a and via uplink via a communication link 225-b. In some aspects, the network device 210 may transmit one or more uplink grants 215 to the modem 205 and the modem 205 may transmit uplink data 220 to the network device 210 over the one or more uplink grants 215 (e.g., over resources indicated by the one or more uplink grants 215). In some cases, the modem 205 may receive the one or more uplink grants 215 continuously and the modem 205 may transmit over a cumulation of the resources indicated by the uplink grants 215. In other words, the network device 210, over a period of time, may transmit a number of uplink grants 215 in a cumulative manner (e.g., the uplink grants 215 may add to each other) and the modem 205 may transmit the uplink data 220 to the network device 210 over the communication link 225-b using a cumulation of the uplink grants 215 received during the time period.

In some cases, the uplink data 220 that the modem 205 may transmit to the network device 210 may originate at a source, such as an application processor or a tethered client (e.g., a device connected to or "tethered" to the modem 205 via an ethernet connection, a universal serial bus (USB) connection, a peripheral component interconnect express (PCIe) connection, or a wireless fidelity (Wi-Fi) connection, among other examples). For example, an application processor or the tethered client may transmit the uplink data 220 to the modem 205 for uplink transmission to the network device 210. The modem 205 may store the uplink data 220 received from the application processor in a buffer of the modem (e.g., the modem 205 may store and queue the uplink data 220 for uplink transmission in the buffer of the modem). As such, the modem 205 may transmit the buffered uplink data 220 to the network device 210 over the communication link 225-b over the resources indicated by the one or more uplink grants 215.

The uplink data 220 may refer to or include various types of traffic flows, service flows, IP flows, QoS flows, and the like. For example, the uplink data 220 may include data that is part of a SLA or data that is otherwise prioritized as well as default or non-prioritized data. Such default or non-prioritized data may be referred to herein as best effort traffic, as such data may be associated with relatively flexible latency constraints (e.g., may not be latency sensitive). The data that is part of the SLA, on the other hand, may be associated with a QoS constraint (e.g., a QoS guarantee) based on the SLA and may be associated with relatively strict latency constraints (e.g., may be latency sensitive). In such examples in which the uplink data 220 includes prioritized data and non-prioritized data (e.g., default data), the modem 205 (or the UE) may give the prioritized data "head of the line" treatment for the same bearer, such as a data radio bearer (DRB), at the modem 205. As such, the prioritized data may be processed prior to the non-prioritized data.

In some cases, such as in cases in which the modem 205 (or the UE) employs flow control mechanisms in the uplink to slow down a transmitter (e.g., the data source, such as the application processor). For example, if the size of the cumulation of the uplink grants 215 is insufficient (e.g., lower than a threshold size) to match a data rate of the application processor and if the modem 205 refrains from employing a flow control mechanism, the modem 205 may drop some data packets as there may be insufficient bandwidth to transmit the uplink data 220 to the network device 210 without exceeding a threshold limit of the buffer at the modem 205. As such, if the uplink grants 215 (e.g., network grants) are unable to scale up with the actual data rate from the source (e.g., the application processor or tethered clients), the modem 205 may employ flow control to avoid packet drops on the modem 205. In some cases, however, the flow control employed by the modem 205 may be a bearer level functionality such that the flow control will apply to the uplink data 220 regardless of the priority level of the uplink data 220. For example, based on the flow control being a bearer level functionality and using a same bearer to transmit the prioritized data and the non-prioritized data, the flow control may apply to both the prioritized data and the non-prioritized data. Such application of the flow control to the prioritized data may result in longer delay for the prioritized data (as its transmission is reduced or stopped at the application processor or tethered client), which may result in a breaking of the SLA involving the prioritized data, or at least a risk thereof.

For instance, in examples in which the modem 205 (or the UE) has an ongoing file transfer protocol (FTP) upload and triggers a video call (e.g., a WhatsApp or Facebook video call), the modem 205 may transmit both the FTP upload data (relatively lower priority data) and the video call data (relatively higher priority data) on the same interne bearer. As such, any reduction in the uplink grants 215 may affect the FTP upload data and the video call data (and therefore the video call quality). Such reduction in the uplink grants 215 may occur due to cell loading, poor radio frequency conditions, or for various other reasons. The modem 205, based on the reduction in the uplink grants 215, may determine or otherwise identify that the modem 205 is unable to transmit the FTP upload data and the video call data to the network device 210 as quickly as the modem 205 is receiving the FTP upload data and the video call data from a sender (e.g., the application processor or tethered clients), which may result in an accumulation of data in the buffer of the modem 205 and the employment of flow control of the sender to lower the rate at which the modem 205 is receiving data from the sender. In some cases, the flow control may apply to both the FTP upload data and the video call data and, as FTP may occupy a relatively large portion of the uplink bandwidth or resources at the modem 205, the bandwidth or resources that are available for the video call data may be further reduced. A similar example can be understood in terms of playing a game (e.g., a video game) along with a file upload such that the user experience playing the game may be affected due to flow control affecting both the data flow of the game and the file upload.

In some cases, such joint flow control of prioritized data (e.g., a prioritized stream) and concurrent non-prioritized data may result in increased latency for the prioritized data, risking a SLA or a QoS guarantee. In an example, a user datagram protocol (UDP) ping may be an example of or otherwise function as prioritized data (or as an indicator of latency of prioritized data) and, if the modem 205 transmits the UDP ping on a prioritized port in the uplink with no concurrent (non-prioritized) data, the UDP ping may return a value of 12 ms. If the modem 205 transmits the UDP ping on a prioritized port in the uplink with concurrent (non-prioritized) data at 18 Mbps and if the uplink grants 215 provide up to 16 Mbps (such that the 5G physical layer (PHY) can support up to 16 Mbps), the UDP ping may return a value of 30 ms (an increase of 150%). Alternatively, if the modem 205 transmits the UDP ping on a prioritized port in the uplink with concurrent (non-prioritized) data at 14 Mbps and if the uplink grants 215 provide up to 16 Mbps (such that the 5G PHY can support up to 16 Mbps), the UDP ping may return a value of 12 ms.

In other words, if the modem 205 attempts to transmit data (whether prioritized or not) at a lesser data rate than the data rate supported by the uplink grants 215, the modem 205 may refrain from applying or apply minimal flow control. Alternatively, if an application processor or a tethered client transmits uplink data 220 to the modem 205 at a greater data rate than what is supported by the uplink grants 215, the modem 205 may be bound by the data rate supported by the uplink grants 215 and may accordingly apply flow control to the uplink data 220 being received from the application processor or the tethered client to avoid packet drops. In cases in which the non-prioritized data has a greater data rate than what is supported by the uplink grants 215 and the non-prioritized data triggers the flow control, flow control on the prioritized data may be unnecessary.

Accordingly, if the prioritized data is sent by the modem 205 in the uplink along with the non-prioritized data and if the physical layer in the uplink has insufficient uplink grants 215 to process the data, the modem 205 may apply a same flow control mechanism on both of the prioritized data and the non-prioritized data (e.g., both streams of data) due to the flow control being a bearer level functionality, which may result in degraded QoS for the prioritized data. As such, although the prioritized data in the modem 205 may receive prioritization due to "head of the line" treatment, the flow controlling of the data source (e.g., the application processor or tethered clients) at the bearer level may still add delay or latency for the prioritized data.

In some implementations of the present disclosure, the modem 205 may apply selective flow control enforcement per service flow (e.g., per prioritized data flow or per non-prioritized data flow) to exclude some pre-determined or pre-defined service flows (such as service flows that may be categorized as prioritized data or a prioritized service flow), which may maintain or improve the QoS of the excluded service flows in various network conditions as compared to best effort or heavy data traffic (e.g., non-prioritized data traffic). As such, if the uplink grants 215 provided to the modem 205 by the network device 210 are insufficient (such that flow control may be triggered or applied) the modem 205 may primarily flow control the non-prioritized data while refraining from, or at least secondarily, flow controlling the prioritized data.

In some examples, the modem 205 may achieve such per service flow or per data traffic type flow control enforcement based on maintaining separate buffers at the modem 205 for prioritized data and for non-prioritized data. In such examples, each separate buffer may include a threshold level associated with triggering a flow control command for the data stored in that respective buffer. For example, if the modem 205 stores non-prioritized data in a first buffer and if an amount of the non-prioritized data in the first buffer is greater than a threshold level of the first buffer, the modem 205 may apply flow control for the non-prioritized data. Similarly, if the modem 205 stores prioritized data in a second buffer and if an amount of the prioritized data in the second buffer is greater than a threshold level of the second buffer, the modem 205 may apply flow control for the prioritized data. Additional details relating to such use of separate buffers for applying separate flow control for the prioritized data and the non-prioritized data are described herein, including with reference to FIG. 3.

In some other examples, the modem 205 may achieve such per service flow or per data traffic type flow control enforcement based on storing the prioritized data and the non-prioritized data in one buffer of the modem 205 configured with multiple threshold levels associated with triggering separate flow control commands. For instance, in such examples, if an amount of the data (including both prioritized data and non-prioritized data) in the one buffer of the modem 205 is greater than a first threshold of the one buffer, the modem 205 may apply flow control for the non-prioritized data. If the flow control for the non-prioritized data is insufficient such that the amount of the data in the one buffer of the modem 205 continues to increase and becomes greater than a second threshold level of the one buffer, the modem 205 may apply flow control for the prioritized data (such that both the non-prioritized data and the prioritized data are flow controlled if the amount of data in the one buffer exceeds the second threshold). Additional details relating to such use of one buffer with multiple threshold levels for applying separate flow control for the prioritized data and the non-prioritized data are described herein, including with reference to FIG. 4.

In some other examples, the modem 205 may achieve such per service flow or per data traffic type flow control enforcement based on an exception (a mutually understood exception) at the data source (e.g., at the application processor or the tethered clients) from a first flow control command. For instance, in such examples, the modem 205 may store the prioritized data and the non-prioritized data in a buffer (or one or more buffers) of the modem 205 and if an amount of data in the buffer exceeds a threshold level of the buffer, the modem 205 may send a first flow control command to the application processor. The application processor, based on employing the exception, may exclude the prioritized data from the first flow control command and continue transmitting the prioritized data to the modem 205 without flow control. The modem 205, receiving the prioritized data after exceeding the threshold of the buffer, may store the received prioritized data above the threshold and below an upper limit threshold of the buffer (e.g., an upper limit or maximum capacity of the buffer). In examples in which the received prioritized data reaches or exceeds the upper limit threshold of the buffer, the modem 205 may transmit a second flow control command to the application processor indicating the application processor to stop transmitting the prioritized data. Additional details relating to such an exception for prioritized data created by the application processor are described herein, including with reference to FIG. 5.

Further, although described herein in the context of prioritized data and non-prioritized data, the present disclosure can be implemented using any number of service flow or data traffic types. For example, the modem 205 may apply flow control based on different prioritized traffic levels, such as based on differentiated services code point (DSCP) classes or values in which case multiple buffers per priority level or multiple (e.g., greater than two) flow control messages from the modem 205 may be implemented. Additionally or alternatively, the modem 205 may configure one or more additional thresholds to the one or more buffers of the modem 205 associated with flow enablement such that the modem 205 may enable the flow of the prioritized data prior to enabling the flow of the non-prioritized data.

Figure 3:
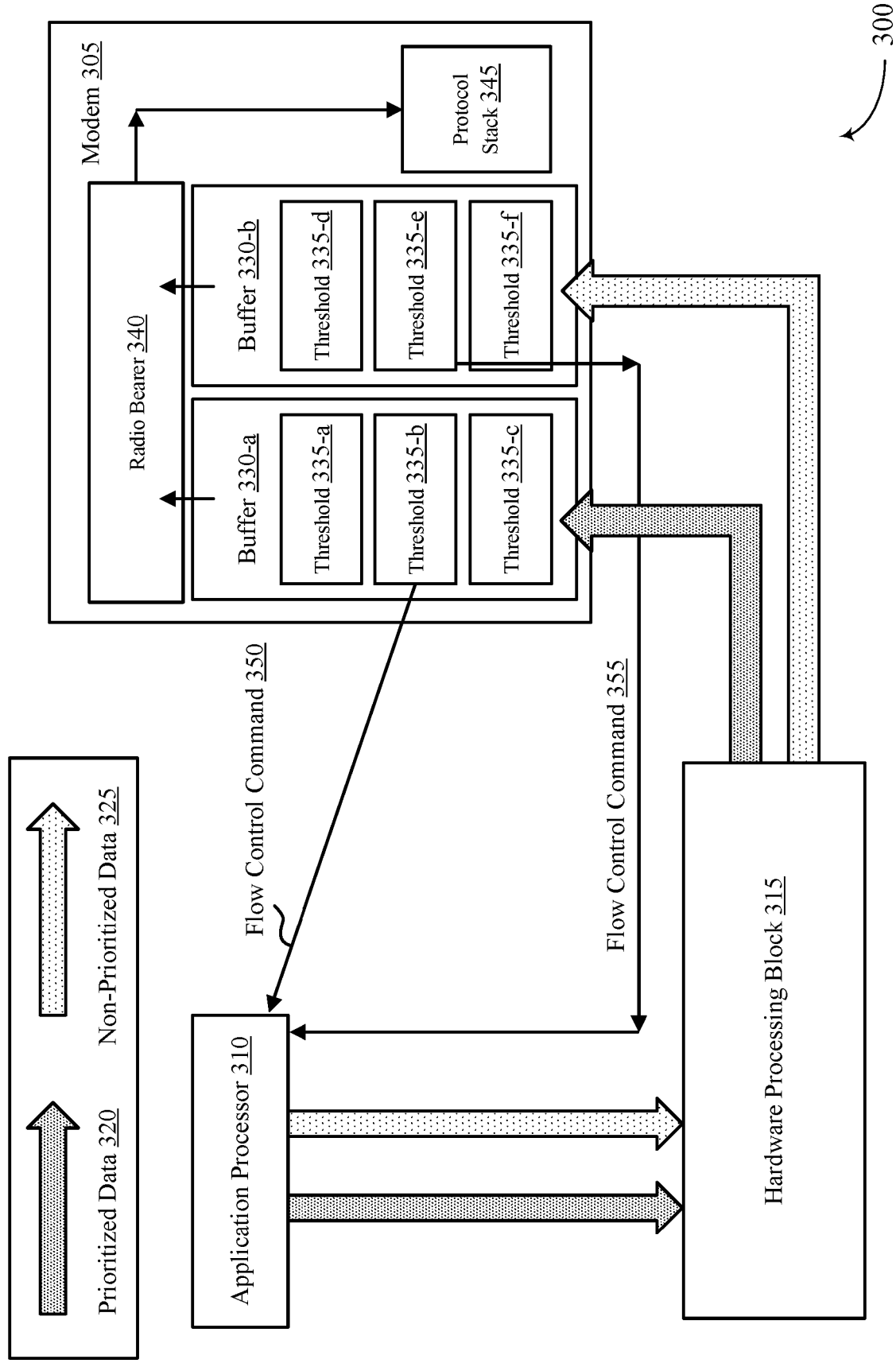
FIGS. 3-5 illustrate examples of data flow diagrams that support techniques for prioritizing service flow to maintain QoS in accordance with various aspects of the present disclosure.

For instance, in examples in which the uplink grants 215 are unavailable for the uplink transmission of the prioritized data and the non-prioritized data from the modem 205 and subsequently become available for the uplink transmission of the prioritized data and the non-prioritized data from the modem 205, the modem 205 may send an indication to enable flow for the prioritized data to provide the application processor with an option to send the prioritized data to the modem 205 prior to sending the non-prioritized data to the modem 205, which may reduce the delay incurred by the prioritized data. Further, although described separately in FIGS. 3-5, a modem 205 may implement any combination of the examples of the present disclosure. For example, the modem 205 may allow for an exception for the prioritized data from a flow control command in examples in which the modem 205 maintains separate buffers, among other examples FIG. 3 illustrates an example of a data flow diagram 300 that supports techniques for prioritizing service flow to maintain QoS in accordance with various aspects of the present disclosure. The data flow diagram 300 illustrates communication between a modem 305, an application processor 310, and an optional hardware processing block 315. In some examples, the modem 305 may achieve flow control enforcement per service flow based on maintaining two separate buffers 330 including a buffer 330-a configured to store prioritized data 320 and a buffer 330-b configured to store non-prioritized data 325.

The modem 305 may transmit the data stored in the two separate buffers 330 based on linking the two separate buffers 330 to a radio bearer 340 (e.g., a DRB) that is coupled with a protocol stack 345 that the modem 305 may use to transmit data to a network device, such as a network device 210 (as shown in FIG. 2). In some aspects, the protocol stack 345 may be an example of a 5G or an LTE protocol stack. The application processor 310 may be an example of or function as a data source, such as a tethered client. The application processor 310 may send data (including the prioritized data 320 and the non-prioritized data 325) to the modem 305 for uplink transmission and, in some cases, may send the data to the modem 305 via an optional hardware processing block 315 (e.g., the use of the optional hardware processing block 315 may be optional or used according to a UE decision). The optional hardware processing block 315 may be an example of a programmable protocol processor or a driver and may support hardware processing of uplink or downlink IP packets.

The modem 305 may store the data received from the application processor 310 according to the service flow or traffic type of the data. For example, the modem 305 may store the prioritized data 320 received from the application processor 310 (via the optional hardware processing block 315) in the buffer 330-a and may store the non-prioritized data 325 received from the application processor 310 (via the optional hardware processing block 315) in the buffer 330-b. Each of the buffers 330 of the modem 305 may be configured or otherwise associated with multiple threshold levels, which may be referred to herein as thresholds 335. For example, the buffer 330-a may include a threshold 335-a, a threshold 335-b, and a threshold 335-c and the buffer 330-b may include a threshold 335-d, a threshold 335-e, and a threshold 335-f, The multiple thresholds 335 of each buffer 330 may reflect an amount of data stored in the buffer 330. For example, in the example of the buffer 330-a, the threshold 335-c may reflect a first amount of data in the buffer 330-a, the threshold 335-b may reflect a second amount of data in the buffer 330-a greater than the first amount, and the threshold 335-a may reflect a third amount of data in the buffer 330-a greater than the second amount. The threshold 335-f, the threshold 335-e, and the threshold 335-d may similar reflect a first amount, a second amount, and a third amount of data in the buffer 330-b, respectively. The various thresholds 335 may be examples of static buffer occupancy levels, and may be defined as a percentage of the depth of the buffer 330 or some static values (e.g., in bytes, etc.). In some aspects, the threshold 335-a and the threshold 335-d may be upper limit thresholds of the buffer 330-a and the buffer 330-b, respectively, and may reflect or otherwise indicate an upper limit or a maximum amount of data that can be stored in each buffer 330.

In some implementations of the present disclosure, the various thresholds 335 of each buffer 330 below the upper limit threshold may be associated with levels at which the modem 305 may change a flow control of the data stored in the respective buffer 330. For example, if the modem 305 identifies that an amount of non-prioritized data 325 stored in the buffer 330-b exceeds the threshold 335-e, the modem 305 may transmit a flow control command 355 to the application processor 310 for the non-prioritized data. Similarly, if the modem 305 identifies that an amount of prioritized data 320 stored in the buffer 330-a exceeds the threshold 335-b, the modem 305 may transmit a flow control command 350 to the application processor 310 for the prioritized data traffic.

In some examples, for instance, the radio bearer 340 of the modem 305 may have an insufficient uplink grant (e.g., a size of the one or more uplink grants received from the network device may be less than a threshold size), and an amount of the prioritized data 320 or the non-prioritized data 325 stored in the buffers 330 of the modem 305 may increase (due to a faster transmitter at the application processor 310 than at the protocol stack 345 of the modem 305). In such examples, the modem 305 may apply flow control to the prioritized data 320 and the non-prioritized data 325 separately based on maintaining the separate buffers 330. In an example (e.g., in an example in which the non-prioritized data 325 has a faster data rate than the prioritized data 320 and reaches the threshold 335-e of the buffer 330-b prior to the prioritized data 320 reaching the threshold 335-b of the buffer 330-a), the modem 305 may initially apply flow control to the non-prioritized data by transmitting the flow control command 355 to the application processor 310.

If the modem 305 determines or otherwise identifies that the network grant situation fails to improve after the application processor 310 applies the flow control command 355 to the non-prioritized data, the modem 305 may transmit the flow control command 350 to the application processor 310 to flow control the prioritized data 320 as well. For example, if the modem 305 identifies that the amount of prioritized data 320 in the buffer 330-a is greater than the threshold 335-b (e.g., becomes greater than the threshold 335-b after flow control is applied by the application processor 310 to the non-prioritized data), the modem 305 may transmit the flow control command 350 to indicate the application processor 310 to flow control the prioritized data 320 based on the flow control command 350.

In such examples in which the modem 305 transmits both of the flow control command 350 and the flow control command 355 to the application processor 310, the application processor 310 may use the flow control command 350 and the flow control command 355 to separately control the flow of the prioritized data 320 and the non-prioritized data 325. For example, the application processor 310 may flow control the prioritized data 320 in accordance with the flow control command 350 and may flow control the non-prioritized data 325 in accordance with the flow control command 355. To support such separation in flow control between the prioritized data 320 and the non-prioritized data 325, the application processor 310 may employ separate interfaces (e.g., separate virtual interfaces) for the prioritized data 320 and the non-prioritized data 325 or employ dynamic traffic shaping per flow based on the separate flow control commands received from the modem 305, or both.

For instance, in examples in which the application processor 310 uses separate interfaces for the prioritized data 320 and the non-prioritized data 325, the application processor 310 may transmit, to the modem 305 via a first interface, the prioritized data 320 according to the flow control command 350 and transmit, to the modem 305 via a second interface, the non-prioritized data 325 according to the flow control command 355. Additionally or alternatively, in examples in which the application processor 310 employs dynamic traffic shaping per flow, the application processor 310 may determine a first data traffic shaping for the non-prioritized data 325 based on the flow control command 355 and may determine a second data traffic shaping for the prioritized data 320 based on the flow control command 350. In such examples, the application processor 310 may transmit the non-prioritized data 325 to the modem 305 according to the first traffic shaping and may transmit the prioritized data 320 to the modem 305 according to the second traffic shaping.

In some examples, the amounts of the prioritized data 320 or the non-prioritized data 325 in the buffer 330-a and the buffer 330-b, respectively, may decrease based on either improving network conditions (e.g., a larger cumulation of uplink grants or greater available bandwidth) or the flow control, or both. In such examples, the modem 305 may determine, if the amounts of the prioritized data 320 or the non-prioritized data 325 in the buffer 330-a and the buffer 330-b, respectively, decrease to or below a threshold 335, to enable flow (e.g., and therefore end or otherwise disable flow control) for either or both of the prioritized data 320 or the non-prioritized data 325. For example, if the modem 305 determines or otherwise identifies that the amount of the prioritized data 320 in the buffer 330-a is equal to or less than the threshold 335-c, the modem 305 may transmit an indication to enable flow for the prioritized data 320 to the application processor 310.

The application processor 310, based on receiving the indication to enable flow for the prioritized data 320, may disable the flow control applied to the prioritized data 320 and resume transmitting the prioritized data 320 to the modem 305 without flow control. Similarly, if the modem 305 determines or otherwise identifies that the amount of the non-prioritized data 325 in the buffer 330-b is equal to or less than the threshold 335-f, the modem 305 may transmit an indication to enable flow for the non-prioritized data 325 to the application processor 310. The application processor 310, receiving the indication to enable flow for the non-prioritized data 325, may disable the flow control applied to the non-prioritized data 325 and resume transmitting the non-prioritized data 325 to the modem 305 without flow control.

Figure 4:
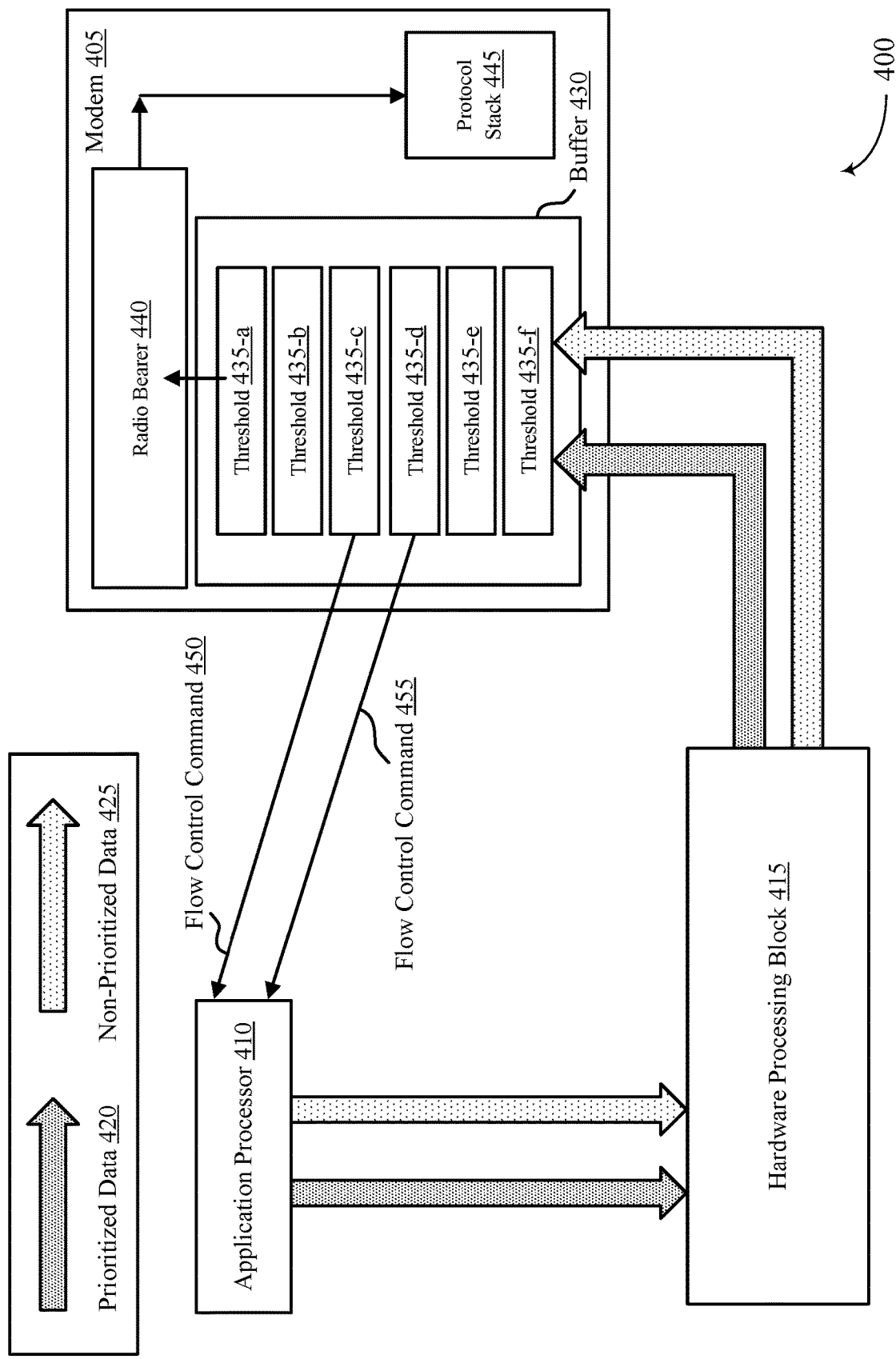

FIG. 4 illustrates an example of a data flow diagram 400 that supports techniques for prioritizing service flow to maintain QoS in accordance with various aspects of the present disclosure. The data flow diagram 400 illustrates communication between a modem 405, an application processor 410, and an optional hardware processing block 415. In some examples, the modem 405 may support flow control enforcement per service flow based on configuring thresholds 435 of a buffer 430 (e.g., one buffer) that indicate separate flow control commands for prioritized data 420 or non-prioritized data 425.

The application processor 410 may be an example of or function as a data source, such as a tethered client. The application processor 410 may send data (including the prioritized data 420 and the non-prioritized data 425) to the modem 405 for uplink transmission and, in some cases, may send the data to the modem 405 via an optional hardware processing block 415 (e.g., the use of the optional hardware processing block 415 may be optional or used according to a UE decision). The optional hardware processing block 415 may be an example of a programmable protocol processor or a driver and may support hardware processing of uplink or downlink IP packets. The modem 405 may store the data received from the application processor 410 in the buffer 430 and the modem 405 may transmit the data stored in the buffer 430 to a network device based on linking the buffer 430 to a radio bearer 440 (e.g., a DRB) that is coupled with a protocol stack 445 that the modem 405 may use to transmit data to the network device, such as a network device 210 (as shown in FIG. 2). In some aspects, the protocol stack 445 may be an example of a 5G or an LTE protocol stack.

The buffer 430 may be configured with or otherwise associated with multiple threshold levels, which may be referred to herein as thresholds 435. For example, the buffer 430 may include a threshold 435-a, a threshold 435-b, a threshold 435-c, a threshold 435-d, a threshold 435-e, and a threshold 435-f, The multiple thresholds 435 of the buffer 430 may reflect an amount of data stored in the buffer 430. For example, the threshold 435-f may reflect a first amount of data in the buffer 430, the threshold 435-e may reflect a second amount of data in the buffer 430 greater than the first amount, the threshold 435-d may reflect a third amount of data in the buffer 430 greater than the second amount, and so on up to the threshold 435-a, which may reflect a maximum amount of data that can be stored in the buffer 430. The various thresholds 435 may be examples of static buffer occupancy levels, and may be defined as a percentage of the depth of the buffer 430 or some static values (e.g., in bytes, etc.).

In some aspects, for example, the threshold 435-f may reflect approximately 15% of the size of the buffer 430, the threshold 435-e may reflect approximately 30% of the size of the buffer 430, the threshold 435-d may reflect approximately 60% of the size of the buffer 430, the threshold 435-c may reflect approximately 80% of the size of the buffer 430, the threshold 435-b may reflect approximately 90% of the size of the buffer 430, and the threshold 435-a may reflect approximately 100% of the size of the buffer 430. In some examples, the thresholds 435 (how much occupancy each buffer 430 reflects) can be changed dynamically (e.g., dynamically configured) in software.

In some implementations of the present disclosure, the modem 305 may configure or interpret the various thresholds 435 of the buffer 430 as triggers for changing a flow control of either the prioritized data 420 or the non-prioritized data 425. For example, the modem 405 may configure the thresholds 435 of the buffer 430 such that each threshold 435 is associated with triggering a flow control change for the prioritized data 420 or associated with triggering a flow control change for the non-prioritized data 425. For instance, the modem 405 may configure the threshold 435-f, the threshold 435-d, and the threshold 435-b to be associated with triggering a flow control change for the non-prioritized data 425 and the modem 405 may configure the threshold 435-e, the threshold 435-c, and the threshold 435-a to be associated with triggering a flow control change for the prioritized data 420.

For example, based on a current occupancy of the buffer 430, the modem 405 may transmit different flow control commands (e.g., flow control messages) to the application processor 410 for the prioritized data 420 or for the non-prioritized data 425. For instance, the modem 405 and the application processor 410 may define two flow control messages including a flow control command 450 for the prioritized data 420 and a flow control command 455 for the non-prioritized data 425 and define two different thresholds 435 associated with triggering transmission of the flow control command 450 or the flow control command 455. In an example, the modem 405 may configure the threshold 435-d to be associated with triggering transmission of the flow control command 455 for the non-prioritized data 425 to the application processor 410 and the modem 405 may configure the threshold 435-c to be associated with triggering transmission of the flow control command 450 for the prioritized data 420 to the application processor 410.

As such, if the modem 405 determines or otherwise identifies that the amount of the prioritized data 420 and the non-prioritized data 425 in the buffer 430 is greater than the threshold 435-d, the modem 405 may transmit the flow control command 455 to the application processor 410 to flow control the non-prioritized data 425. The application processor 410, based on receiving the flow control command 455, may apply the flow control command 455 to the non-prioritized data 425. For example, the application processor 410 may add filters or traffic shaping to flow control the non-prioritized data 425 (and not the prioritized data 420) based on the flow control command 455. If the amount of the prioritized data 420 and the non-prioritized data 425 in the buffer 430 continues to increase (e.g., after the application of the flow control command 455 to the non-prioritized data 425) and if the modem 405 determines or otherwise identifies that the amount of the prioritized data 420 and the non-prioritized data 425 in the buffer 430 is greater than the threshold 435-c, the modem 405 may transmit the flow control command 450 to the application processor 410 to flow control the prioritized data 420 (e.g., in addition to flow controlling the non-prioritized data 425). The application processor 410, based on receiving the flow control command 450, may apply the flow control command 450 to the prioritized data 420. For example, the application processor 410 may add filters or traffic shaping to flow control the prioritized data 420 based on the flow control command 450.

In some examples, the amount of the prioritized data 420 and the non-prioritized data 425 in the buffer 430 may decrease based on either improving network conditions (e.g., a larger cumulation of uplink grants or greater available bandwidth) or the flow control, or both. In such examples, the modem 405 may determine, if the amount of the prioritized data 420 and the non-prioritized data 425 in the buffer 430 decrease to or below a threshold 435, to enable flow (e.g., and therefore end or otherwise disable flow control) for either or both of the prioritized data 420 or the non-prioritized data 425. In some implementations, the modem 405 may configure separate thresholds 435 of the buffer 430 for enabling flow for the prioritized data 420 and for enabling the flow for the non-prioritized data 425.

For example, the modem 405 may configure the threshold 435-e to be associated with triggering an indication to enable flow for the prioritized data 420 and may configure the threshold 435-f to be associated with triggering an indication to enable flow for the non-prioritized data 425. As such, if the modem 405 determines or otherwise identifies that the amount of the data (e.g., the prioritized data 420 and the non-prioritized data 425) in the buffer 430 is equal to or less than the threshold 435-e, the modem 405 may transmit an indication to enable flow for the prioritized data 420 to the application processor 410. The application processor 410, based on receiving the indication to enable flow for the prioritized data 420, may disable the flow control applied to the prioritized data 420 and resume transmitting the prioritized data 420 to the modem without flow control. Similarly, if the modem 405 determines or otherwise identifies that the amount of the data in the buffer 430 is equal to or less than the threshold 435-f, the modem 405 may transmit an indication to enable flow for the non-prioritized data 425 to the application processor 410. The application processor 410, based on receiving the indication to enable flow for the non-prioritized data 425, may disable the flow control applied to the non-prioritized data 425 and resume transmitting the non-prioritized data 425 to the modem without flow control. As such, the modem 405 may provide more buffer space in which the prioritized data 420 may grow or accumulate before the prioritized data 420 is flow controlled as compared to the non-prioritized data 425.

In some implementations, the modem 405 may enable or disable one or more of the thresholds 435 of the buffer 430 based on which of the flows are ongoing (e.g., currently being provided to the modem 405 from the application processor 410). For example, if the application processor 410 is transmitting non-prioritized data 425 to the modem 405 and not transmitting any prioritized data 420 to the modem 405, the modem 405 may disable the thresholds 435 of the buffer 430 that are configured to be associated with a flow control change of the prioritized data 420 (as those thresholds 435 may be irrelevant to the non-prioritized data 425). Similarly, if the application processor 410 is transmitting prioritized data 420 to the modem 405 and not transmitting any non-prioritized data 425 to the modem 405, the modem 405 may disable the thresholds 435 of the buffer 430 that are configured to be associated with a flow control change of the non-prioritized data 425 (as those thresholds 435 may be irrelevant to the prioritized data 420).

Further, in addition or as an alternative to selectively enabling or disabling thresholds 435 of the buffer 430 based on whether the application processor 410 is transmitting the prioritized data 420 or the non-prioritized data 425, or both, the modem 405 may dynamically change the amount of data each threshold 435 reflects based on whether the application processor 410 is transmitting only prioritized data 420, only non-prioritized data 425, or both prioritized data 420 and non-prioritized data 425. As such, for example, the modem 405 may avoid using unnecessarily small thresholds 435 for non-prioritized data 425 in examples in which the modem is receiving the non-prioritized data 425 and not receiving the prioritized data 420 (e.g., in examples in which default or non-prioritized data 425 is the only data in the system).

Figure 5:
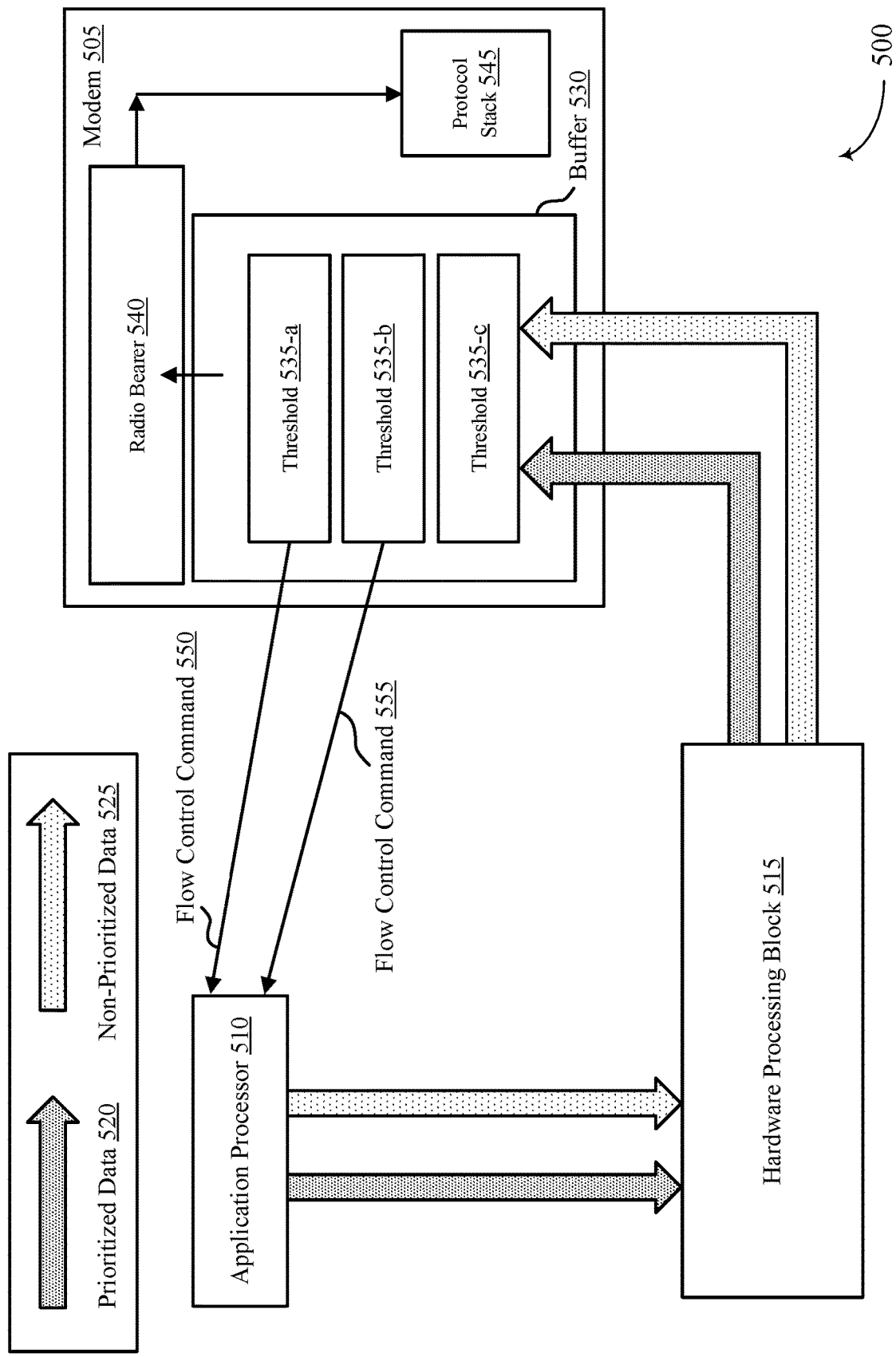

FIG. 5 illustrates an example of a data flow diagram 500 that supports techniques for prioritizing service flow to maintain QoS in accordance with various aspects of the present disclosure. The data flow diagram 500 illustrates communication between a modem 505, an application processor 510, and an optional hardware processing block 515. In some examples, the modem 505 and the application processor 510 may achieve flow control enforcement per service flow based on an exception at the application processor 510 for prioritized data 520 from a first flow control command from the modem 505.

The application processor 510 may be an example of or function as a data source, such as a tethered client. The application processor 510 may send data (including the prioritized data 520 and non-prioritized data 525) to the modem 505 for uplink transmission and, in some cases, may send the data to the modem 505 via an optional hardware processing block 515 (e.g., the use of the optional hardware processing block 415 may be optional or used according to a UE decision). The optional hardware processing block 515 may be an example of a programmable protocol processor or a driver and may support hardware processing of uplink or downlink IP packets. The modem 505 may store the data (e.g., the prioritized data 520 and the non-prioritized data 525) received from the application processor 510 in a buffer 530 and the modem 505 may transmit the data stored in the buffer 530 to a network device based on linking the buffer 530 to a radio bearer 540 (e.g., a DRB) that is coupled with a protocol stack 545 that the modem 505 may use to transmit the data to the network device, such as a network device 210 (as shown in FIG. 2). In some aspects, the protocol stack 545 may be an example of a 5G or an LTE protocol stack.

The buffer 530 may be configured with or otherwise associated with multiple threshold levels, which may be referred to herein as thresholds 535. For example, the buffer 530 may include a threshold 535-a, a threshold 535-b, and a threshold 535-c. The multiple thresholds 535 of the buffer 530 may reflect an amount of data stored in the buffer 530. For example, the threshold 535-c may reflect a first amount of data in the buffer 530, the threshold 535-b may reflect a second amount of data in the buffer 530 greater than the first amount, and the threshold 535-a may reflect a third amount of data in the buffer 530 greater than the second amount. The various thresholds 535 may be examples of static buffer occupancy levels, and may be defined as a percentage of the depth of the buffer 530 or some static values (e.g., in bytes, etc.). Such thresholds 535 may hold good, even with no data in the buffer 530.

In some examples, the modem 505 may configure or interpret the various thresholds 535 of the buffer 530 as triggers for changing a flow control of the prioritized data 520 or the non-prioritized data 525, or both. For example, the modem 505 may configure each threshold 535 of the buffer 530 such that each threshold 535 is associated with triggering a flow control change for the prioritized data 520 or associated with triggering a flow control change for the non-prioritized data 525, or both. For example, the modem 505 may configure the threshold 535-b to be associated with triggering a flow control change for the prioritized data 520 or the non-prioritized data 525, or both. As such, if the modem 505 identifies that an amount of the prioritized data 520 and the non-prioritized data 525 stored in the buffer 530 is greater than the threshold 535-b, the modem 505 may transmit a flow control command 555 to the application processor 510 for either or both of the prioritized data 520 or the non-prioritized data 525.

In some implementations, the application processor 510, based on receiving the flow control command 555, may create an exception for the prioritized data 520 from the flow control command 555. In other words, the application processor 510 may exclude the prioritized data 520 from the flow control command 555 and continue transmitting the prioritized data 520 to the modem 505 without applying the flow control command to the prioritized data 520 (even if the flow is disabled from the modem 505). The modem 505, based on receiving the prioritized data after transmitting the flow control command 555 based on identifying that the amount of the data in the buffer 530 is greater than the threshold 535-b, may store the received prioritized data 520 in the buffer 530 above the threshold 535-b. For example, if flow is disabled from the modem 505 (e.g., based on a lack of availability of an uplink grant for the modem 505), the modem 505 may be unable to reduce the amount of data stored in the buffer 530 below the threshold 535-b (at which point the modem 505 transmits the flow control command 555) and, accordingly, the modem 505 may store the prioritized data 520 that continues to be received after the flow control command 555 in the buffer 530 between the threshold 535-b and the threshold 535-a.

In some examples, based on the exception for the prioritized data 520 from the flow control command 555 created at the application processor 510 and the continuation of the application processor 510 to transmit the prioritized data 520 to the modem 505, the amount of data stored in the buffer 530 may approach, reach, or exceed the threshold 535-a, which may function as an upper limit threshold corresponding to an upper limit (e.g., a maximum amount) of data that the modem 505 can store in the buffer 530. In such examples, the modem 505, based on determining or otherwise identifying that the amount of data stored in the buffer 530 is equal to or greater than the threshold 535-a, may transmit a flow control command 550 to the application processor 510 to indicate the application processor to stop sending any further prioritized data 520. In some aspects, the flow control command 550 may include or be an example of a flag (e.g., a specific flag associated with indicating the application processor 510 to stop transmitting data to the modem 505) of one or more bits.

In some aspects, even though the prioritized data 520 may be de-queued by layer 2 (L2) initially, the prioritized data 520 in transmit between the application processor 510 and the modem 505 at the time the modem 505 transmits the flow control command 550 may be dropped (e.g., not stored in the buffer 530 of the modem 505 because the buffer 530 is full). As such, the modem 505 and the application processor 510 may support such an exception for the prioritized data 520 in scenarios in which the prioritized data 520 from the application processor 510 is delay sensitive but can accept minimal drops without communication failure.

Figure 6:
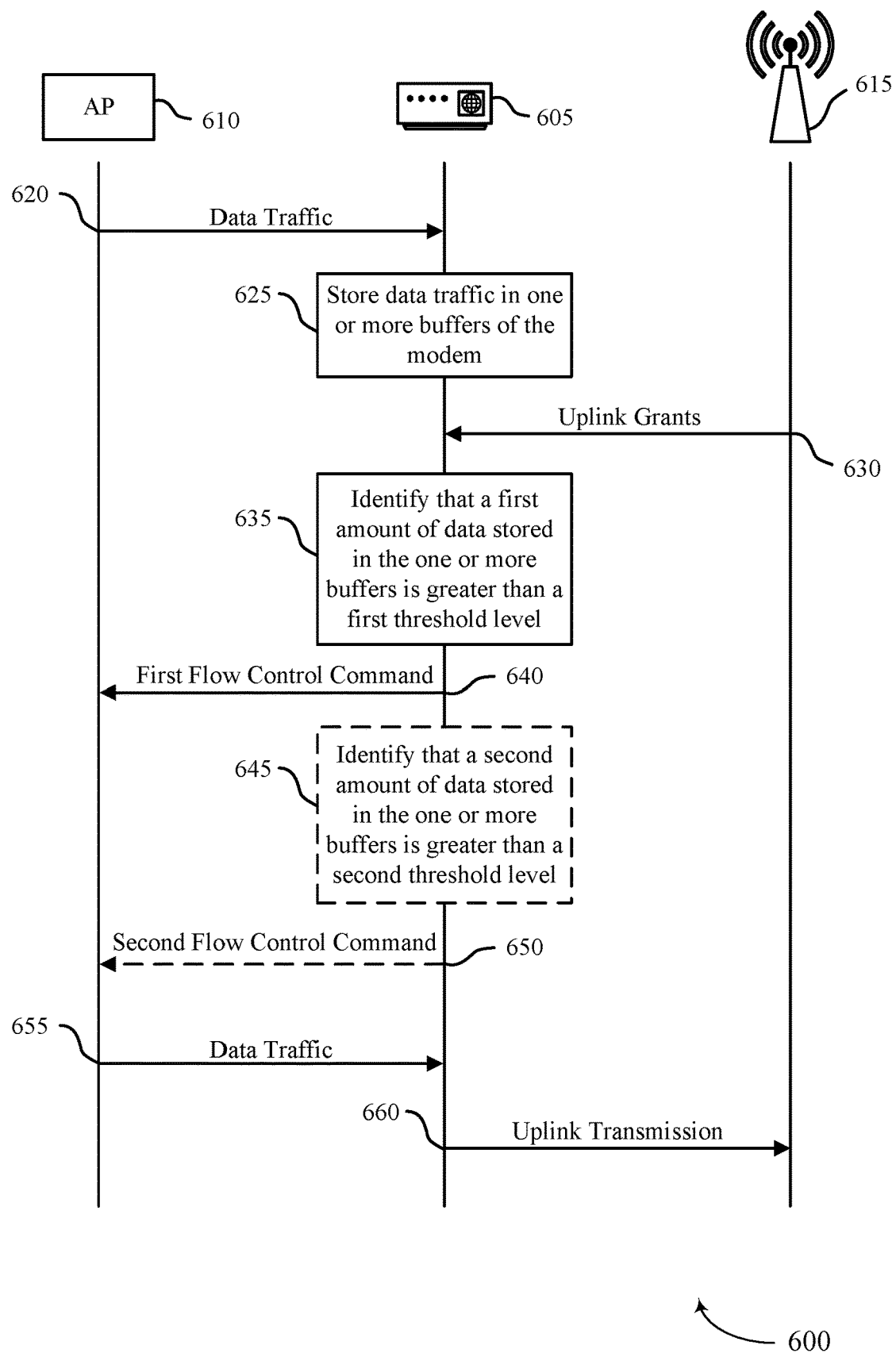
FIG. 6 illustrates an example of a process flow that supports techniques for prioritizing service flow to maintain QoS in accordance with various aspects of the present disclosure.

FIG. 6 illustrates an example of a process flow 600 that supports techniques for prioritizing service flow to maintain QoS in accordance with various aspects of the present disclosure. The process flow 600 illustrates communication between a modem 605, an application processor 610 (i.e., an AP 610), and a network device 615. In some examples, the modem 605 and the application processor 610 may support flow control enforcement per service flow to maintain a QoS of prioritized data (e.g., data associated with or part of a SLA) in various network conditions.

At 620, the application processor 610 (e.g., a second device) may transmit, to the modem 605 (e.g., a first device), a first data traffic having a first QoS and a first priority level and a second data traffic having a second QoS and a secondary priority level greater than the first priority level. In other words, the first data traffic may include or be an example of non-prioritized data and the second data traffic may include or be an example of prioritized data traffic. In some aspects, the first data traffic and the second data traffic may be equivalently referred to herein as service flows, data streams, QoS flows, or IP flows, among other examples. In some aspects, the first data traffic and the second data traffic may be for a same radio bearer.

At 625, the modem 605 may store the first data traffic and the second data traffic in one or more buffers of the first device. In some implementations, for example, the modem 605 may store the first data traffic in a first buffer and the modem 605 may store the second data traffic in a second buffer, as illustrated by and described in more detail with reference to FIG. 3. In some other implementations, the modem 605 may store the first data traffic and the second data traffic in one buffer, as illustrated by and described in more detail with reference to FIGS. 4 and 5.

At 630, the network device 615 may transmit one or more uplink grants for uplink transmission of the first data traffic and the second data traffic. In some examples, a size of a cumulation of the one or more uplink grants may be less than a threshold size, the threshold size being a minimum size to concurrently carry the first data traffic and the second data traffic without triggering a flow control command. For example, the size of the cumulation of the one or more uplink grants may be associated with a data rate less than a data rate of a data source (e.g., the application processor 610) such that the modem 605 may determine to employ a flow control to slow a transmitter of the application processor 610 to avoid packet drops at the modem 605.

At 635, the modem 605 may identify that a first amount of data stored in the one or more buffers of the modem 605 is greater than a first threshold level. In some examples, such as in examples in which the modem 605 maintains separate buffers for the first data traffic and the second data traffic, at 635, the modem 605 may identify that an amount of the first data traffic in the first buffer of the modem 605 is greater than a first threshold level of the first buffer. In some other examples, such as in examples in which the modem 605 maintains one buffer for the first data traffic and the second data traffic, at 635, the modem may identify that an amount of the first data traffic and the second data traffic in the one buffer is greater than a first (and lower) threshold of the one buffer. As such, in examples in which the modem 605 maintains separate buffers, the first amount of data may refer to an amount of the first data traffic in the first buffer and, in examples in which the modem 605 uses one buffer, the first amount of data may refer to an amount of a summation of the first data traffic and the second data traffic in the one buffer. Similarly, the first threshold may refer to a threshold triggering flow control of the first buffer including the first data traffic or to a lower threshold triggering flow control (of multiple thresholds triggering flow control) of the one buffer including both the first data traffic and the second data traffic.

At 640, the modem 605 may transmit, to the application processor 610, a first flow control command for the first data traffic based on the first priority level of the first data traffic being less than the second priority level of the second data traffic and based on identifying that the first amount of data in the one or more buffers is greater than the first threshold level. The application processor 610, based on receiving the first flow control command at 640, may apply the first flow control command to the first data traffic. For example, based on receiving the first flow control command, the application processor 610 may transmit the first data traffic to the modem 605 in accordance with the first flow control command. In some aspects, the first flow control command may reduce the data rate or the bit rate of the first data traffic. In some other aspects, the first flow control command may indicate the application processor 610 to stop transmitting the first data traffic to the modem 605.

At 645, the modem 605 may, in some implementations, identify that a second amount of data stored in the one or more buffers of the modem 605 is greater than a second threshold level. In some examples, such as in examples in which the modem 605 maintains separate buffers for the first data traffic and the second data traffic, at 645, the modem 605 may identify that an amount of the second data traffic in the second buffer of the modem 605 is greater than a second threshold level of the second buffer. In some other examples, such as in examples in which the modem 605 maintains one buffer for the first data traffic and the second data traffic, at 645, the modem may identify that an amount of the first data traffic and the second data traffic in the one buffer is greater than a second (and higher) threshold of the one buffer. As such, in examples in which the modem 605 maintains separate buffers, the second amount of data may refer to an amount of the second data traffic in the second buffer and, in examples in which the modem 605 uses one buffer, the second amount of data may refer to an amount of a summation of the first data traffic and the second data traffic in the one buffer. Similarly, the second threshold may refer to a threshold triggering flow control of the second buffer including the second data traffic or to a higher threshold triggering flow control (of multiple thresholds triggering flow control) of the one buffer including both the first data traffic and the second data traffic.

At 650, the modem 605 may, in some implementations, transmit, to the application processor 610, a second flow control command for the second data traffic based on identifying that the second amount of data in the one or more buffers is greater than the second threshold level. The application processor 610, based on receiving the second flow control command at 650, may apply the second flow control command to the second data traffic. For example, based on receiving the second flow control command, the application processor 610 may transmit the second data traffic to the modem 605 in accordance with the second flow control command. In some aspects, the second flow control command may reduce the data rate or the bit rate of the second data traffic. In some other aspects, the second flow control command may indicate the application processor 610 to stop transmitting the second data traffic to the modem 605.

At 655, the application processor 610 may transmit the first data traffic and the second data traffic to the modem 605 in accordance with the first flow control command received at 640 or the second flow control command received at 650, or both. In some examples, the application processor 610 may transmit, to the modem 605 via a first interface (e.g., a first virtual interface), the first data traffic according to the first flow control command and transmit, to the modem 605 via a second interface (e.g., a second virtual interface), the second data traffic according to the second flow control command. In some other examples, the application processor 610 may transmit, to the modem 605, the first data traffic according to a first traffic shaping (e.g., a dynamic traffic shaping) based on the first flow control command and transmit, to the modem 605, the second data traffic according to a second traffic shaping (e.g., a dynamic traffic shaping) based on the second flow control command.

At 660, the modem 605 may transmit the uplink transmission including the first data traffic and the second data traffic to the network device 615. Further, although shown as being done once at 660, the modem 605 may continuously transmit the first data traffic and the second data traffic to the network device 615 through the process flow 600 based on a continuous stream of uplink grants being received from the network device 615.

Figure 7:
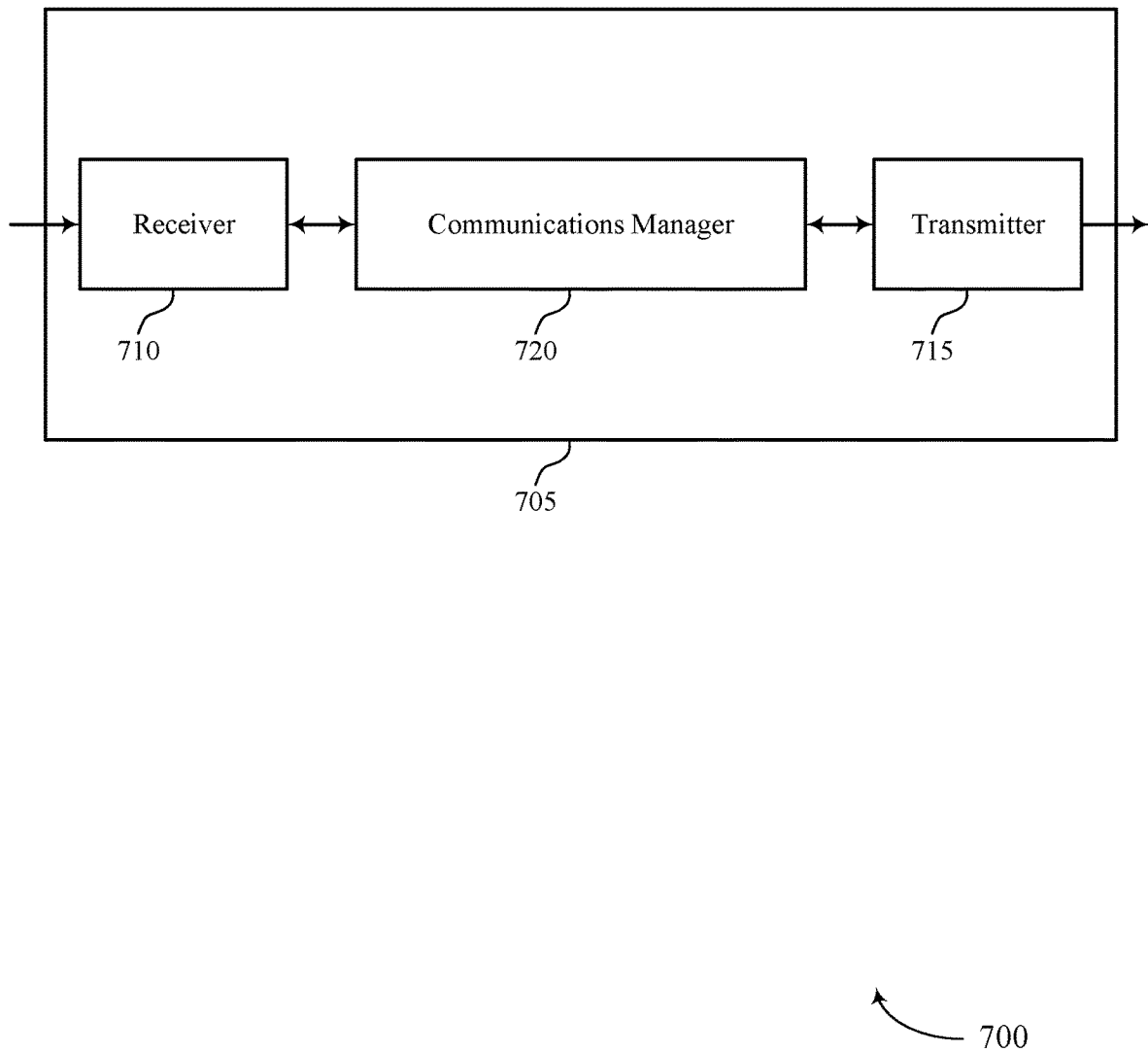
FIGS. 7 and 8 show block diagrams of devices that support techniques for prioritizing service flow to maintain QoS in accordance with various aspects of the present disclosure.

FIG. 7 shows a block diagram 700 of a device 705 that supports techniques for prioritizing service flow to maintain QoS in accordance with various aspects of the present disclosure. The device 705 may be an example of aspects of a modem of a UE 115 or an application processor as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for prioritizing service flow to maintain QoS). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for prioritizing service flow to maintain QoS). In some examples, the transmitter 715 may be co-located with a receiver 710 in a transceiver component. The transmitter 715 may utilize a single antenna or a set of multiple antennas.

The communications manager 720, the receiver 710, the transmitter 715, or various combinations thereof or various components thereof may be examples of means for performing various aspects of techniques for prioritizing service flow to maintain QoS as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first device in accordance with examples as disclosed herein. For example, the communications manager 720 may be configured as or otherwise support a means for receiving, from a second device, a first data traffic having a first QoS and a first priority level. The communications manager 720 may be configured as or otherwise support a means for receiving, from the second device, a second data traffic having a second QoS and a second priority level greater than the first priority level, where the first data traffic and the second data traffic are for a same radio bearer. The communications manager 720 may be configured as or otherwise support a means for storing the first data traffic and the second data traffic in one or more buffers of the first device. The communications manager 720 may be configured as or otherwise support a means for transmitting, to the second device, a first flow control command for the first data traffic based on the first priority level associated with the first data traffic being less than the second priority level and further based on a threshold level of a buffer of the one or more buffers.

Additionally or alternatively, the communications manager 720 may support wireless communication at a second device in accordance with examples as disclosed herein. For example, the communications manager 720 may be configured as or otherwise support a means for transmitting, to a first device, a first data traffic having a first QoS and a first priority level. The communications manager 720 may be configured as or otherwise support a means for transmitting, to the first device, a second data traffic having a second QoS and a second priority level greater than the first priority level, where the first data traffic and the second data traffic are for a same radio bearer. The communications manager 720 may be configured as or otherwise support a means for receiving, from the first device, a first flow control command for the first data traffic based on the first priority level associated with the first data traffic being less than the second priority level and further based on a threshold level of a buffer of the one or more buffers. The communications manager 720 may be configured as or otherwise support a means for transmitting, to the first device, the first data traffic and the second data traffic, the first data traffic transmitted according to the first flow control command.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for enforcing flow control on a per service flow basis, which may result in lower latency for prioritized data types associated with a QoS defined by a SLA. As such, the modem may experience a greater likelihood to satisfy the SLA of prioritized data in various network conditions, such as even in scenarios involving a relatively small bandwidth allocation.

Figure 8:
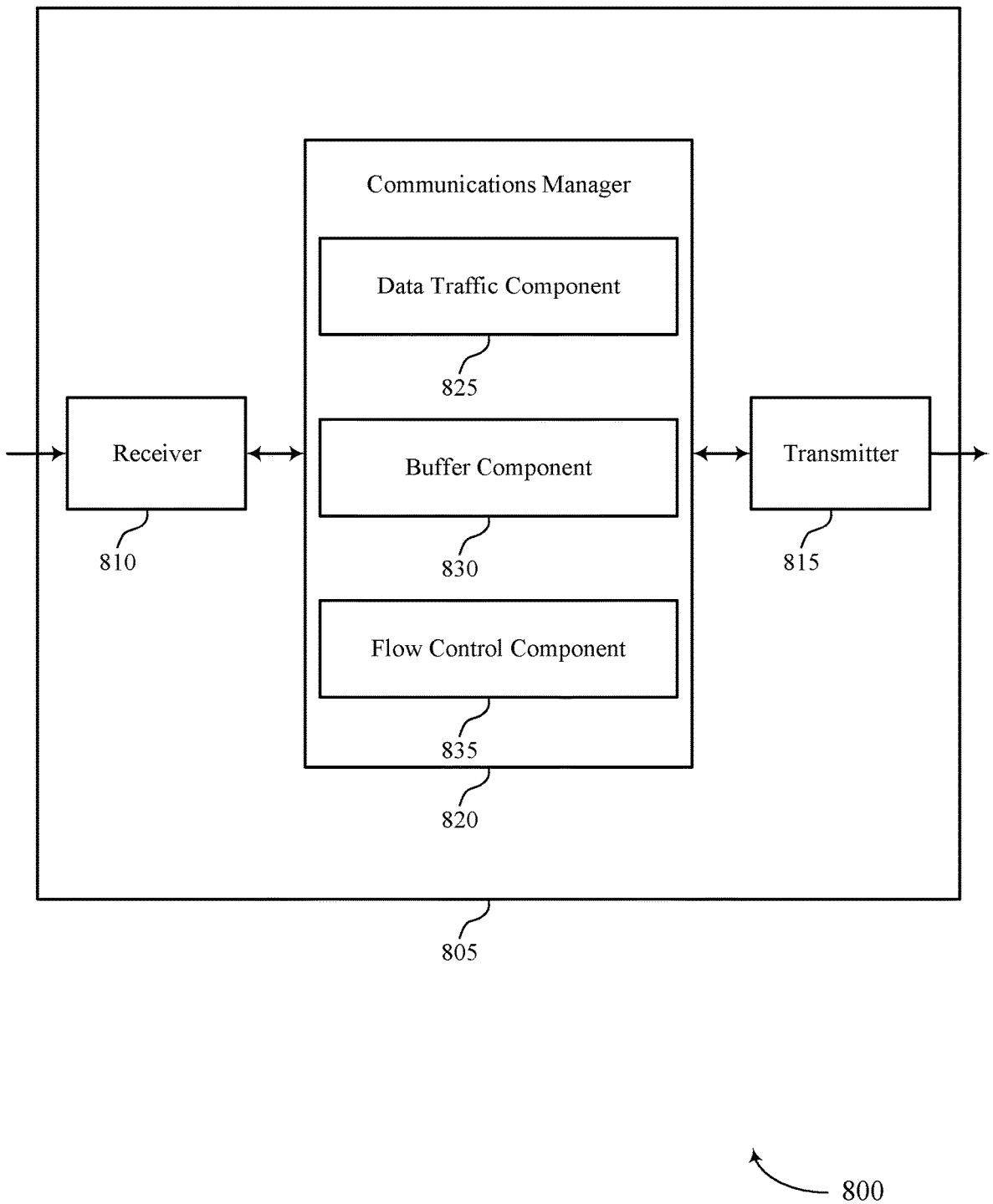

FIG. 8 shows a block diagram 800 of a device 805 that supports techniques for prioritizing service flow to maintain QoS in accordance with various aspects of the present disclosure. The device 805 may be an example of aspects of a device 705, a modem of a UE 115, or an application processor as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for prioritizing service flow to maintain QoS). Information may be passed on to other components of the device 805. The receiver 810 may utilize a single antenna or a set of multiple antennas.

The transmitter 815 may provide a means for transmitting signals generated by other components of the device 805.

For example, the transmitter 815 may transmit information such as packets, user data, control information, or any combination thereof associated with various information channels (e.g., control channels, data channels, information channels related to techniques for prioritizing service flow to maintain QoS). In some examples, the transmitter 815 may be co-located with a receiver 810 in a transceiver component. The transmitter 815 may utilize a single antenna or a set of multiple antennas.

The device 805, or various components thereof, may be an example of means for performing various aspects of techniques for prioritizing service flow to maintain QoS as described herein. For example, the communications manager 820 may include a data traffic component 825, a buffer component 830, a flow control component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first device in accordance with examples as disclosed herein. The data traffic component 825 may be configured as or otherwise support a means for receiving, from a second device, a first data traffic having a first QoS and a first priority level. The data traffic component 825 may be configured as or otherwise support a means for receiving, from the second device, a second data traffic having a second QoS and a second priority level greater than the first priority level, where the first data traffic and the second data traffic are for a same radio bearer. The buffer component 830 may be configured as or otherwise support a means for storing the first data traffic and the second data traffic in one or more buffers of the first device. The flow control component 835 may be configured as or otherwise support a means for transmitting, to the second device, a first flow control command for the first data traffic based on the first priority level associated with the first data traffic being less than the second priority level and further based on a threshold level of a buffer of the one or more buffers.

Additionally or alternatively, the communications manager 820 may support wireless communication at a second device in accordance with examples as disclosed herein. The data traffic component 825 may be configured as or otherwise support a means for transmitting, to a first device, a first data traffic having a first QoS and a first priority level. The data traffic component 825 may be configured as or otherwise support a means for transmitting, to the first device, a second data traffic having a second QoS and a second priority level greater than the first priority level, where the first data traffic and the second data traffic are for a same radio bearer. The flow control component 835 may be configured as or otherwise support a means for receiving, from the first device, a first flow control command for the first data traffic based on the first priority level associated with the first data traffic being less than the second priority level and further based on a threshold level of a buffer of the one or more buffers. The data traffic component 825 may be configured as or otherwise support a means for transmitting, to the first device, the first data traffic and the second data traffic, the first data traffic transmitted according to the first flow control command.

Figure 9:
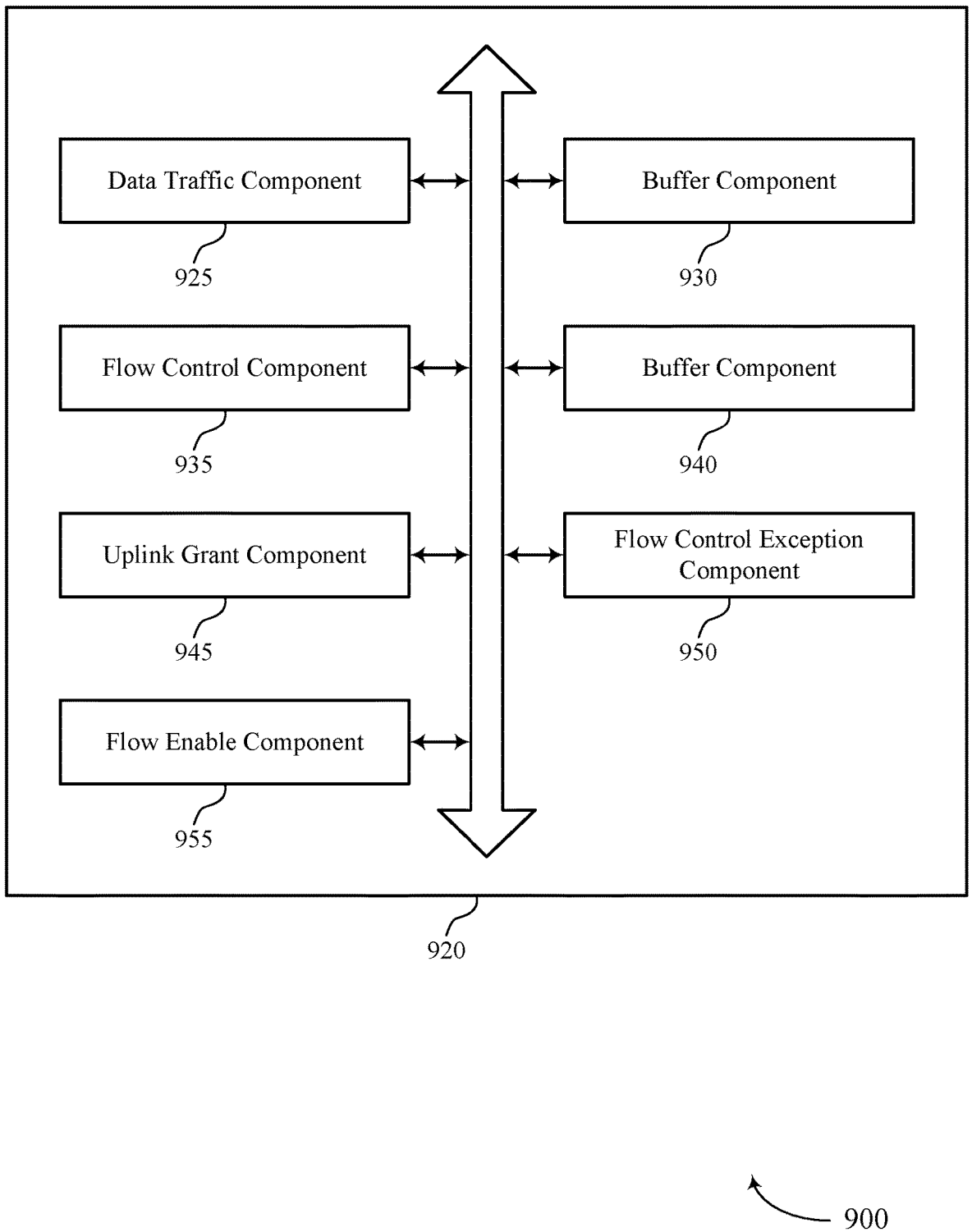
FIG. 9 shows a block diagram of a communications manager that supports techniques for prioritizing service flow to maintain QoS in accordance with various aspects of the present disclosure.

FIG. 9 shows a block diagram 900 of a communications manager 920 that supports techniques for prioritizing service flow to maintain QoS in accordance with various aspects of the present disclosure. The communications manager 920 may be an example of aspects of a communications manager 720, a communications manager 820, or both, as described herein. For example, the communications manager 920 may operate in or function as a modem or an application processor. The communications manager 920, or various components thereof, may be an example of means for performing various aspects of techniques for prioritizing service flow to maintain QoS as described herein. For example, the communications manager 920 may include a data traffic component 925, a buffer component 930, a flow control component 935, a buffer component 940, an uplink grant component 945, a flow control exception component 950, a flow enable component 955, or any combination thereof. Each of these components may communicate, directly or indirectly, with one another (e.g., via one or more buses).

The communications manager 920, when implemented in a modem, may support wireless communication at a first device in accordance with examples as disclosed herein. The data traffic component 925 may be configured as or otherwise support a means for receiving, from a second device, a first data traffic having a first QoS and a first priority level. In some examples, the data traffic component 925 may be configured as or otherwise support a means for receiving, from the second device, a second data traffic having a second QoS and a second priority level greater than the first priority level, where the first data traffic and the second data traffic are for a same radio bearer. The buffer component 930 may be configured as or otherwise support a means for storing the first data traffic and the second data traffic in one or more buffers of the first device. The flow control component 935 may be configured as or otherwise support a means for transmitting, to the second device, a first flow control command for the first data traffic based on the first priority level associated with the first data traffic being less than the second priority level and further based on a threshold level of a buffer of the one or more buffers.

In some examples, to support storing the first data traffic and the second data traffic in the one or more buffers of the first device, the buffer component 940 may be configured as or otherwise support a means for storing the first data traffic in a first buffer of the first device and the second data traffic in a second buffer of the first device, where the first buffer and the second buffer are linked to a same data radio bearer, and where and each of the first buffer and the second buffer include a set of multiple threshold levels that are each configured based on the first priority level and the second priority level.

In some examples, to support transmitting the first flow control command for the first data traffic, the flow control component 935 may be configured as or otherwise support a means for transmitting the first flow control command for the first data traffic based on a first amount of the first data traffic stored in the first buffer being greater than a first threshold level of the first buffer.

In some examples, the flow control component 935 may be configured as or otherwise support a means for transmitting, to the second device, a second flow control command for the second data traffic based on a second amount of the second data traffic stored in the second buffer being greater than a second threshold level of the second buffer.

In some examples, to support storing the first data traffic and the second data traffic in the one or more buffers of the first device, the buffer component 940 may be configured as or otherwise support a means for storing the first data traffic and the second data traffic in one buffer of the first device, the one buffer including a set of multiple threshold levels, where each threshold level of the set of multiple threshold levels is configured based on the first priority level and the second priority level.

In some examples, to support transmitting the first flow control command for the first data traffic, the flow control component 935 may be configured as or otherwise support a means for transmitting the first flow control command for the first data traffic based on a first amount of the first data traffic and the second data traffic stored in the one buffer being greater than a first threshold level of the one buffer, where the first threshold level is associated with triggering the first flow control command for the first data traffic.

In some examples, the flow enable component 955 may be configured as or otherwise support a means for transmitting, to the second device, an indication to enable flow for the first data traffic based on the first amount of the first data traffic and the second data traffic stored in the one buffer being less than a second threshold level of the one buffer, where the second threshold level is associated with triggering the indication to enable flow for the first data traffic.

In some examples, the flow control component 935 may be configured as or otherwise support a means for transmitting, to the second device, a second flow control command for the second data traffic based on a first amount of the first data traffic and the second data traffic stored in the one buffer being greater than a first threshold level of the one buffer, where the first threshold level is associated with triggering the second flow control command for the second data traffic.

In some examples, the flow enable component 955 may be configured as or otherwise support a means for transmitting, to the second device, an indication to enable flow for the second data traffic based on the first amount of the first data traffic and the second data traffic stored in the one buffer being less than a second threshold level of the one buffer, where the second threshold level is associated with triggering the indication to enable flow for the second data traffic.

In some examples, the set of multiple threshold levels include at least a first threshold level triggering transmission of the first flow control command for the first data traffic and a second threshold level triggering transmission of a second flow control command for the second data traffic, the first threshold level being less than the second threshold level.

In some examples, to support transmitting the first flow control command for the first data traffic, the flow control component 935 may be configured as or otherwise support a means for transmitting the first flow control command based on a first amount of the first data traffic and the second data traffic stored in the one or more buffers being greater than a threshold level of the one or more buffers.

In some examples, the flow control exception component 950 may be configured as or otherwise support a means for receiving, from the second device, the second data traffic based on an exception of the second data traffic from the first flow control command. In some examples, the buffer component 940 may be configured as or otherwise support a means for storing the second data traffic in the one or more buffers between the threshold level and an upper limit threshold level. In some examples, the flow control component 935 may be configured as or otherwise support a means for transmitting, to the second device, a second flow control command including an indication to stop transmitting the second data traffic based on a second amount of the second data traffic stored in the one or more buffers being equal to or greater than the upper limit threshold level.

In some examples, the uplink grant component 945 may be configured as or otherwise support a means for receiving, from a network device, one or more uplink grants for uplink transmission of the first data traffic and the second data traffic to the network device, where a size of a cumulation of the one or more uplink grants is less than a threshold size, the threshold size being a minimum size to concurrently carry both the first data traffic and the second data traffic without triggering a flow control command.

In some examples, the second data traffic has the second QoS based on a service level agreement associated with the second data traffic. In some examples, the first data traffic and the second data traffic are associated with different differentiated services code point classes. In some examples, the first device is a modem of a UE and the second device is an application processor or a tethered client tethered to the first device via an ethernet connection, a USB connection, a PCIe connection, or a Wi-Fi connection.

Additionally or alternatively, the communications manager 920, when implemented in an application processor, may support wireless communication at a second device in accordance with examples as disclosed herein. In some examples, the data traffic component 925 may be configured as or otherwise support a means for transmitting, to a first device, a first data traffic having a first QoS and a first priority level. In some examples, the data traffic component 925 may be configured as or otherwise support a means for transmitting, to the first device, a second data traffic having a second QoS and a second priority level greater than the first priority level, where the first data traffic and the second data traffic are for a same radio bearer. In some examples, the flow control component 935 may be configured as or otherwise support a means for receiving, from the first device, a first flow control command for the first data traffic based on the first priority level associated with the first data traffic being less than the second priority level and further based on a threshold level of a buffer of the one or more buffers. In some examples, the data traffic component 925 may be configured as or otherwise support a means for transmitting, to the first device, the first data traffic and the second data traffic, the first data traffic transmitted according to the first flow control command.

In some examples, to support receiving the first flow control command for the first data traffic, the flow control component 935 may be configured as or otherwise support a means for receiving the first flow control command for the first data traffic based on a first amount of the first data traffic stored in a first buffer associated with the first data traffic being greater than a first threshold level of the first buffer.

In some examples, the flow control component 935 may be configured as or otherwise support a means for receiving, from the first device, a second flow control command for the second data traffic based on a second amount of the second data traffic stored in a second buffer associated with the second data traffic being greater than a second threshold level of the second buffer, the second buffer being different from the first buffer.

In some examples, to support transmitting the first data traffic and the second data traffic, the data traffic component 925 may be configured as or otherwise support a means for transmitting, from the second device to the first device via a first interface, the first data traffic according to the first flow control command. In some examples, to support transmitting the first data traffic and the second data traffic, the data traffic component 925 may be configured as or otherwise support a means for transmitting, from the second device to the first device via a second interface, the second data traffic according to the second flow control command.

In some examples, to support transmitting the first data traffic and the second data traffic, the data traffic component 925 may be configured as or otherwise support a means for transmitting, from the second device, the first data traffic according to a first traffic shaping based on the first flow control command. In some examples, to support transmitting the first data traffic and the second data traffic, the data traffic component 925 may be configured as or otherwise support a means for transmitting, from the second device, the second data traffic according to a second traffic shaping based on the second flow control command.

In some examples, to support receiving the first flow control command for the first data traffic, the flow control component 935 may be configured as or otherwise support a means for receiving the first flow control command for the first data traffic based on a first amount of the first data traffic and the second data traffic stored in one buffer of the first device being greater than a first threshold level of the one buffer, where the first threshold level of the one buffer is associated with triggering the first flow control command for the first data traffic.

In some examples, the flow enable component 955 may be configured as or otherwise support a means for receiving, from the first device, an indication to enable flow for the first data traffic based on the first amount of the first data traffic and the second data traffic stored in the one buffer being less than a second threshold level of the one buffer, where the second threshold level of the one buffer is associated with triggering the indication to enable flow for the first data traffic.

In some examples, the flow control component 935 may be configured as or otherwise support a means for receiving, from the first device, a second flow control command for the second data traffic based on a first amount of the first data traffic and the second data traffic stored in one buffer of the first device being greater than a first threshold level of the one buffer, where the first threshold level of the one buffer is associated with triggering the second flow control command for the second data traffic.

In some examples, the flow enable component 955 may be configured as or otherwise support a means for receiving, from the first device, an indication to enable flow for the second data traffic based on the first amount of the first data traffic and the second data traffic stored in the one buffer being less than a second threshold level of the one buffer, where the second threshold level of the one buffer is associated with triggering the indication to enable flow for the second data traffic.

In some examples, to support receiving the first flow control command, the flow control component 935 may be configured as or otherwise support a means for receiving the first flow control command indicating that a first amount of the first data traffic and the second data traffic stored in the one or more buffers of the first device is greater than a threshold level of the one or more buffers.

In some examples, the flow control exception component 950 may be configured as or otherwise support a means for transmitting, to the first device, the second data traffic based on an exception of the second data traffic from the first flow control command. In some examples, the flow control component 935 may be configured as or otherwise support a means for receiving, from the first device, a second flow control command including an indication to stop transmitting the second data traffic based on a second amount of the second data traffic stored in the one or more buffers being equal to or greater than an upper limit threshold level of the one buffer.

In some examples, the uplink grant component 945 may be configured as or otherwise support a means for receiving an indication that a size of a cumulation of one or more uplink grants for uplink transmission of the first data traffic and the second data traffic is less than a threshold size, the threshold size being a minimum size to concurrently carry both the first data traffic and the second data traffic without triggering a flow control command.

In some examples, to support receiving the indication that the size of the cumulation of the one or more uplink grants for the uplink transmission is less than the threshold size, the uplink grant component 945 may be configured as or otherwise support a means for receiving the indication that the one or more uplink grants are not available for the uplink transmission of the first data traffic and the second data traffic.

In some examples, the uplink grant component 945 may be configured as or otherwise support a means for receiving a second indication that the one or more uplink grants are available for the uplink transmission of the first data traffic and the second data traffic. In some examples, to transmit the first data traffic and the second data traffic to the first device, the data traffic component 925 may be configured as or otherwise support a means for transmitting the second data traffic prior to transmitting the first data traffic.

In some examples, the second data traffic has the second QoS based on a service level agreement associated with the second data traffic. In some examples, the first data traffic and the second data traffic are associated with different differentiated services code point classes. In some examples, the first device is a modem of a UE and the second device is an application processor or a tethered client tethered to the first device via an ethernet connection, a USB connection, a PCIe connection, or a Wi-Fi connection.

Figure 10:
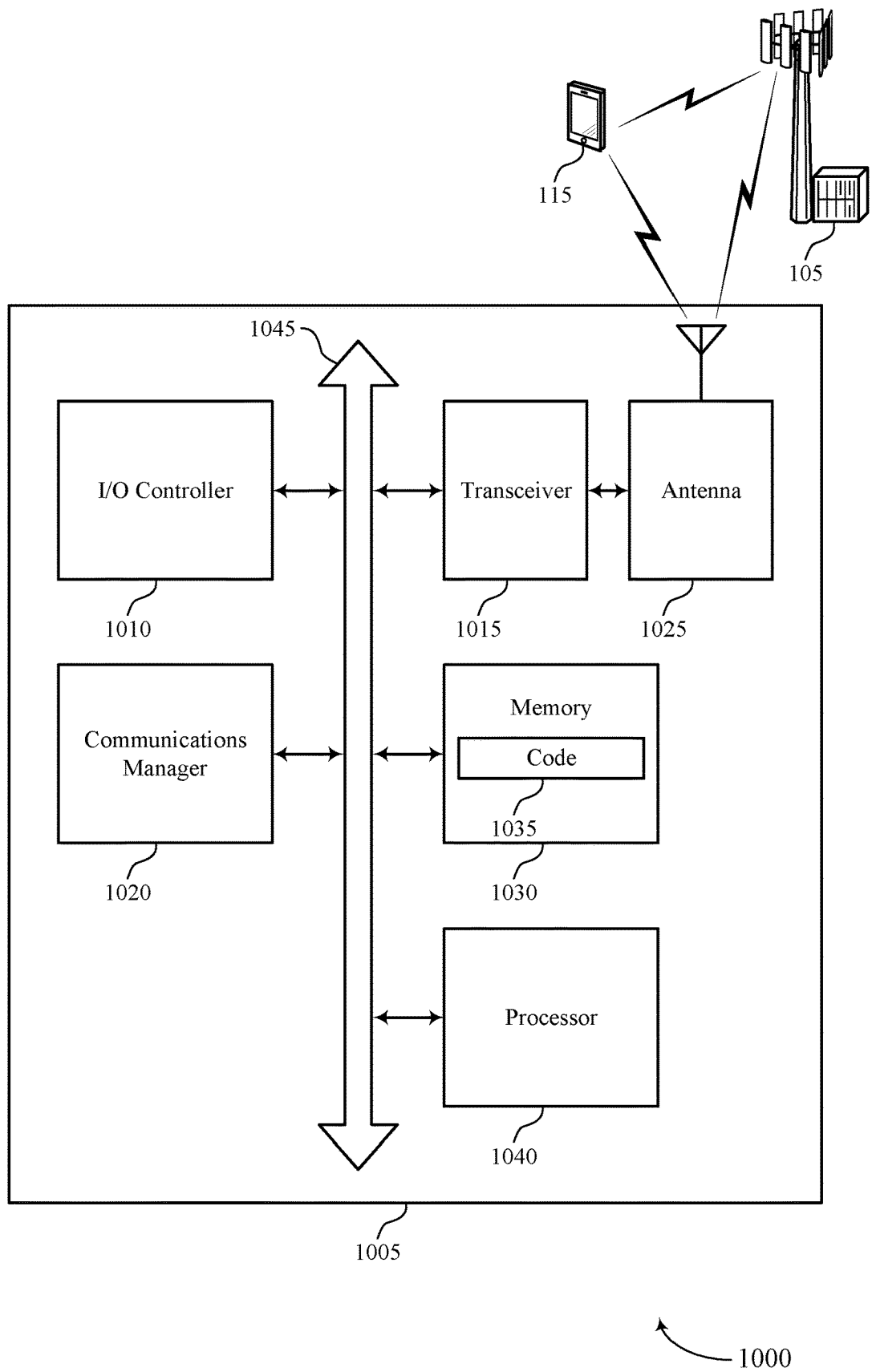
FIG. 10 shows a diagram of a system including a device that supports techniques for prioritizing service flow to maintain QoS in accordance with various aspects of the present disclosure.

FIG. 10 shows a diagram of a system 1000 including a device 1005 that supports techniques for prioritizing service flow to maintain QoS in accordance with various aspects of the present disclosure. The device 1005 may be an example of or include the components of a device 705, a device 805, a modem of a UE 115, or an application processor as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for prioritizing service flow to maintain QoS). For example, the device 1005 or a component of the device 1005 may include a processor 1040 and memory 1030 coupled to the processor 1040, the processor 1040 and memory 1030 configured to perform various functions described herein.

In examples in which the communication manager 1020 is implemented in a modem of a UE, the communications manager 1020 may support wireless communication at a first device in accordance with examples as disclosed herein. For example, the communications manager 1020 may be configured as or otherwise support a means for receiving, from a second device, a first data traffic having a first QoS and a first priority level. The communications manager 1020 may be configured as or otherwise support a means for receiving, from the second device, a second data traffic having a second QoS and a second priority level greater than the first priority level, where the first data traffic and the second data traffic are for a same radio bearer. The communications manager 1020 may be configured as or otherwise support a means for storing the first data traffic and the second data traffic in one or more buffers of the first device. The communications manager 1020 may be configured as or otherwise support a means for transmitting, to the second device, a first flow control command for the first data traffic based on the first priority level associated with the first data traffic being less than the second priority level and further based on a threshold level of a buffer of the one or more buffers.

In examples in which the communications manager 1020 is implemented in an application processor, the communications manager 1020 may support wireless communication at a second device in accordance with examples as disclosed herein. For example, the communications manager 1020 may be configured as or otherwise support a means for transmitting, to a first device, a first data traffic having a first QoS and a first priority level. The communications manager 1020 may be configured as or otherwise support a means for transmitting, to the first device, a second data traffic having a second QoS and a second priority level greater than the first priority level, where the first data traffic and the second data traffic are for a same radio bearer. The communications manager 1020 may be configured as or otherwise support a means for receiving, from the first device, a first flow control command for the first data traffic based on the first priority level associated with the first data traffic being less than the second priority level and further based on a threshold level of a buffer of the one or more buffers. The communications manager 1020 may be configured as or otherwise support a means for transmitting, to the first device, the first data traffic and the second data traffic, the first data traffic transmitted according to the first flow control command.

By including or configuring the communications manager 1020 in accordance with examples as described herein, the device 1005 may support techniques for improved communication reliability, reduced latency, improved user experience related to reduced processing and lower latency of prioritized data (e.g., video call data, video game data), more efficient utilization of communication resources, improved coordination between devices, longer battery life, improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for prioritizing service flow to maintain QoS as described herein, or the processor 1040 and the memory 1030 may be otherwise configured to perform or support such operations.

Figure 11:
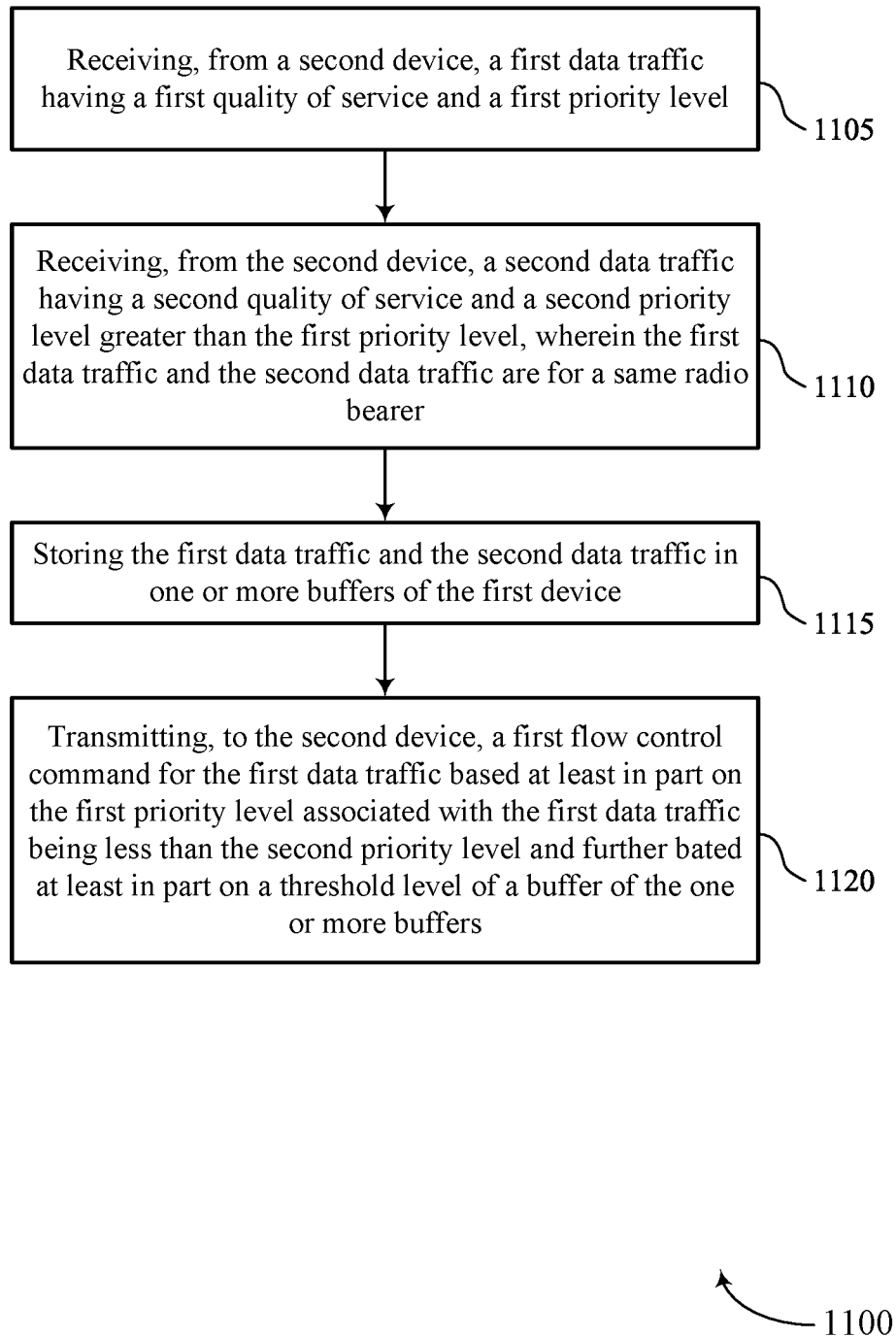
FIGS. 11 through 13 show flowcharts illustrating methods that support techniques for prioritizing service flow to maintain QoS in accordance with various aspects of the present disclosure.

FIG. 11 shows a flowchart illustrating a method 1100 that supports techniques for prioritizing service flow to maintain QoS in accordance with various aspects of the present disclosure. The operations of the method 1100 may be implemented by a modem of a UE or its components as described herein. For example, the operations of the method 1100 may be performed by a modem of a UE 115 as described with reference to FIGS. 1 through 10. In some examples, a modem of a UE may execute a set of instructions to control the functional elements of the modem of the UE to perform the described functions. Additionally or alternatively, the modem of the UE may perform aspects of the described functions using special-purpose hardware.

At 1105, the method may include receiving, from a second device, a first data traffic having a first QoS and a first priority level. The operations of 1105 may be performed in accordance with examples as disclosed herein. In some examples, aspects of the operations of 1105 may be performed by a data traffic component 925 as described with reference to FIG. 9.

At 1110, the method may include receiving, from the second device, a second data traffic having a second QoS and a second priority level greater than the first priority level, where the first data traffic and the second data traffic are for a same radio bearer. The operations of 1110 may be performed in accordance with examples as disclosed herein. In some examples, aspects of the operations of 1110 may be performed by a data traffic component 925 as described with reference to FIG. 9.

At 1115, the method may include storing the first data traffic and the second data traffic in one or more buffers of the first device. The operations of 1115 may be performed in accordance with examples as disclosed herein. In some examples, aspects of the operations of 1115 may be performed by a buffer component 930 as described with reference to FIG. 9.

At 1120, the method may include transmitting, to the second device, a first flow control command for the first data traffic based on the first priority level associated with the first data traffic being less than the second priority level and further based on a threshold level of a buffer of the one or more buffers. The operations of 1120 may be performed in accordance with examples as disclosed herein. In some examples, aspects of the operations of 1120 may be performed by a flow control component 935 as described with reference to FIG. 9.

Figure 12:
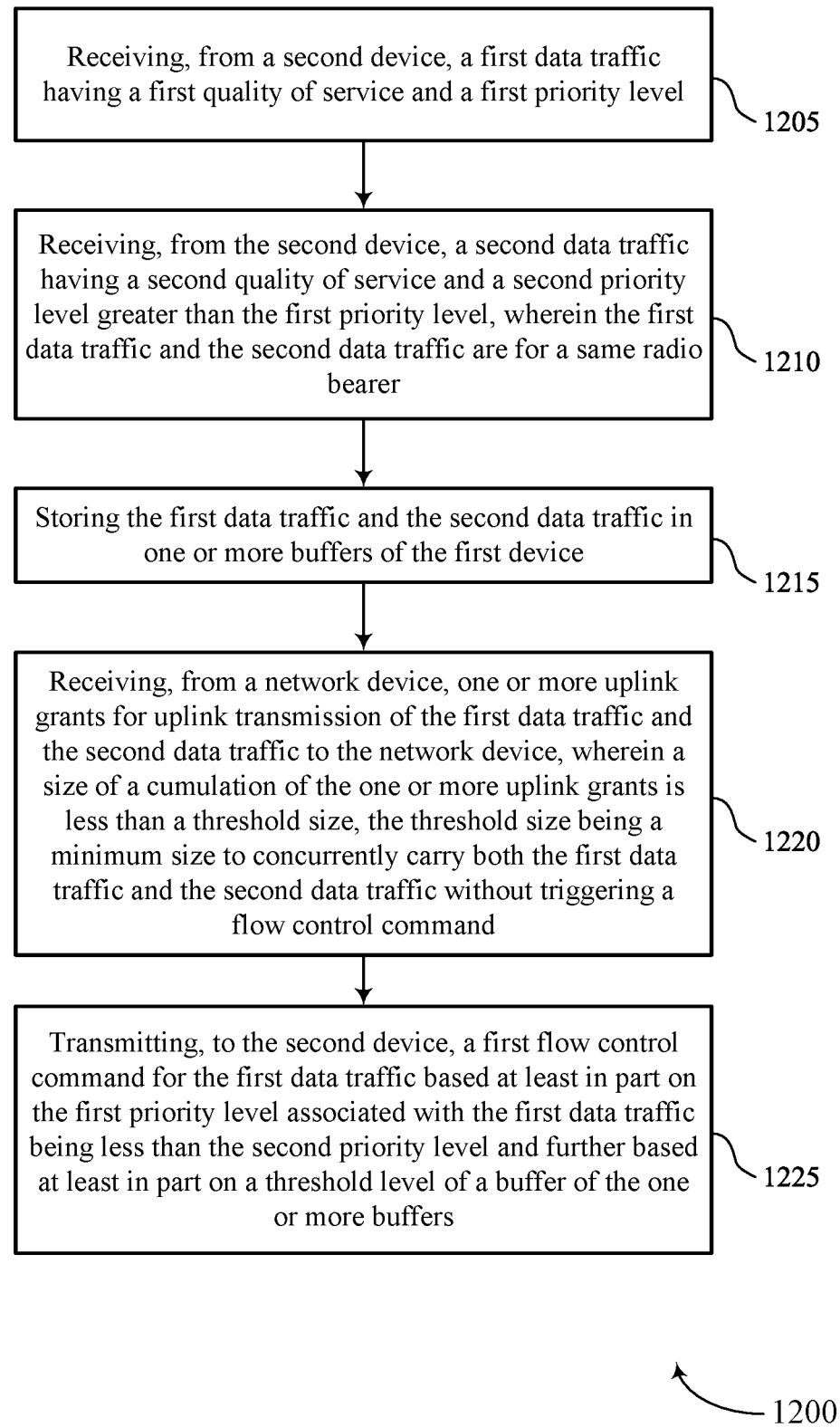

FIG. 12 shows a flowchart illustrating a method 1200 that supports techniques for prioritizing service flow to maintain QoS in accordance with various aspects of the present disclosure. The operations of the method 1200 may be implemented by a modem of a UE or its components as described herein. For example, the operations of the method 1200 may be performed by a modem of a UE 115 as described with reference to FIGS. 1 through 10. In some examples, a modem of a UE may execute a set of instructions to control the functional elements of the modem of the UE to perform the described functions. Additionally or alternatively, the modem of the UE may perform aspects of the described functions using special-purpose hardware.

At 1205, the method may include receiving, from a second device, a first data traffic having a first QoS and a first priority level. The operations of 1205 may be performed in accordance with examples as disclosed herein. In some examples, aspects of the operations of 1205 may be performed by a data traffic component 925 as described with reference to FIG. 9.

At 1210, the method may include receiving, from the second device, a second data traffic having a second QoS and a second priority level greater than the first priority level, where the first data traffic and the second data traffic are for a same radio bearer. The operations of 1210 may be performed in accordance with examples as disclosed herein. In some examples, aspects of the operations of 1210 may be performed by a data traffic component 925 as described with reference to FIG. 9.

At 1215, the method may include storing the first data traffic and the second data traffic in one or more buffers of the first device. The operations of 1215 may be performed in accordance with examples as disclosed herein. In some examples, aspects of the operations of 1215 may be performed by a buffer component 930 as described with reference to FIG. 9.

At 1220, the method may include receiving, from a network device, one or more uplink grants for uplink transmission of the first data traffic and the second data traffic to the network device, where a size of a cumulation of the one or more uplink grants is less than a threshold size, the threshold size being a minimum size to concurrently carry both the first data traffic and the second data traffic without triggering a flow control command. The operations of 1220 may be performed in accordance with examples as disclosed herein. In some examples, aspects of the operations of 1220 may be performed by an uplink grant component 945 as described with reference to FIG. 9.

At 1225, the method may include transmitting, to the second device, a first flow control command for the first data traffic based on the first priority level associated with the first data traffic being less than the second priority level and further based on a threshold level of a buffer of the one or more buffers. The operations of 1225 may be performed in accordance with examples as disclosed herein. In some examples, aspects of the operations of 1225 may be performed by a flow control component 935 as described with reference to FIG. 9.

Figure 13:
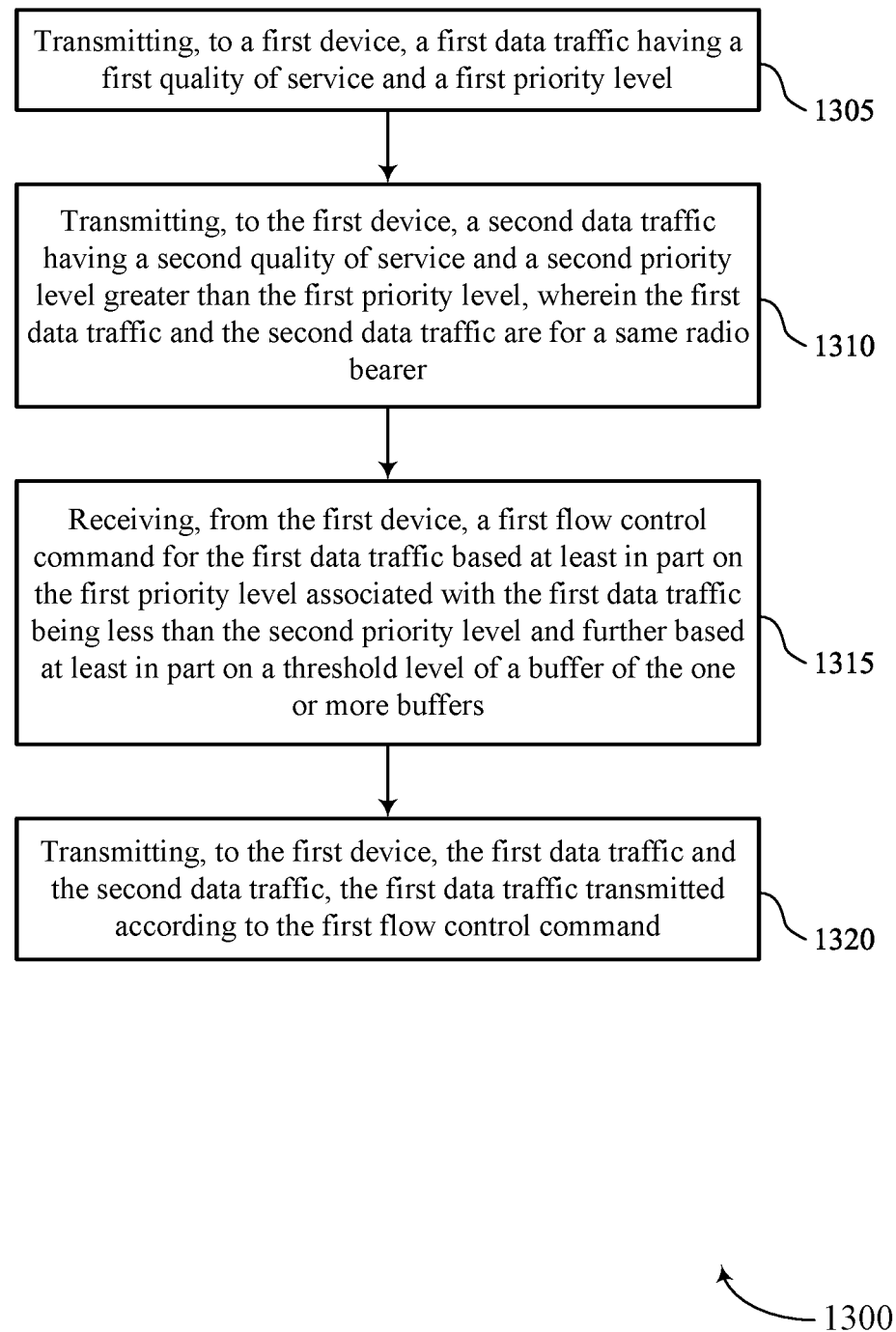

FIG. 13 shows a flowchart illustrating a method 1300 that supports techniques for prioritizing service flow to maintain QoS in accordance with various aspects of the present disclosure. The operations of the method 1300 may be implemented by an application processor or its components as described herein. For example, the operations of the method 1300 may be performed by an application processor as described with reference to FIGS. 1 through 10. In some examples, an application processor may execute a set of instructions to control the functional elements of the application processor to perform the described functions. Additionally or alternatively, the application processor may perform aspects of the described functions using special-purpose hardware.

At 1305, the method may include transmitting, to a first device, a first data traffic having a first QoS and a first priority level. The operations of 1305 may be performed in accordance with examples as disclosed herein. In some examples, aspects of the operations of 1305 may be performed by a data traffic component 925 as described with reference to FIG. 9.

At 1310, the method may include transmitting, to the first device, a second data traffic having a second QoS and a second priority level greater than the first priority level, where the first data traffic and the second data traffic are for a same radio bearer. The operations of 1310 may be performed in accordance with examples as disclosed herein. In some examples, aspects of the operations of 1310 may be performed by a data traffic component 925 as described with reference to FIG. 9.

At 1315, the method may include receiving, from the first device, a first flow control command for the first data traffic based on the first priority level associated with the first data traffic being less than the second priority level and further based on a threshold level of a buffer of the one or more buffers. The operations of 1315 may be performed in accordance with examples as disclosed herein. In some examples, aspects of the operations of 1315 may be performed by a flow control component 935 as described with reference to FIG. 9.

At 1320, the method may include transmitting, to the first device, the first data traffic and the second data traffic, the first data traffic transmitted according to the first flow control command. The operations of 1320 may be performed in accordance with examples as disclosed herein. In some examples, aspects of the operations of 1320 may be performed by a data traffic component 925 as described with reference to FIG. 9.

The following provides an overview of aspects of the present disclosure.

Aspect 1: A method for wireless communication at a first device, comprising: receiving, from a second device, a first data traffic having a first QoS and a first priority level; receiving, from the second device, a second data traffic having a second QoS and a second priority level greater than the first priority level, wherein the first data traffic and the second data traffic are for a same radio bearer; storing the first data traffic and the second data traffic in one or more buffers of the first device; and transmitting, to the second device, a first flow control command for the first data traffic based at least in part on the first priority level associated with the first data traffic being less than the second priority level and further based at least in part on a threshold level of a buffer of the one or more buffers.

Aspect 2: The method of aspect 1, wherein storing the first data traffic and the second data traffic in the one or more buffers of the first device comprises: storing the first data traffic in a first buffer of the first device and the second data traffic in a second buffer of the first device, wherein the first buffer and the second buffer are linked to a same DRB, and wherein and each of the first buffer and the second buffer include a plurality of threshold levels that are each configured based at least in part on the first priority level and the second priority level.

Aspect 3: The method of aspect 2, wherein transmitting the first flow control command for the first data traffic comprises: transmitting the first flow control command for the first data traffic based at least in part on a first amount of the first data traffic stored in the first buffer being greater than a first threshold level of the first buffer.

Aspect 4: The method of any of aspects 2 through 3, further comprising: transmitting, to the second device, a second flow control command for the second data traffic based at least in part on a second amount of the second data traffic stored in the second buffer being greater than a second threshold level of the second buffer.

Aspect 5: The method of aspect 1, wherein storing the first data traffic and the second data traffic in the one or more buffers of the first device comprises: storing the first data traffic and the second data traffic in one buffer of the first device, the one buffer including a plurality of threshold levels, wherein each threshold level of the plurality of threshold levels is configured based at least in part on the first priority level and the second priority level.

Aspect 6: The method of aspect 5, wherein transmitting the first flow control command for the first data traffic comprises: transmitting the first flow control command for the first data traffic based at least in part on a first amount of the first data traffic and the second data traffic stored in the one buffer being greater than a first threshold level of the one buffer, wherein the first threshold level is associated with triggering the first flow control command for the first data traffic.

Aspect 7: The method of aspect 6, further comprising: transmitting, to the second device, an indication to enable flow for the first data traffic based at least in part on the first amount of the first data traffic and the second data traffic stored in the one buffer being less than a second threshold level of the one buffer, wherein the second threshold level is associated with triggering the indication to enable flow for the first data traffic.

Aspect 8: The method of any of aspects 5 through 7, further comprising: transmitting, to the second device, a second flow control command for the second data traffic based at least in part on a first amount of the first data traffic and the second data traffic stored in the one buffer being greater than a first threshold level of the one buffer, wherein the first threshold level is associated with triggering the second flow control command for the second data traffic.

Aspect 9: The method of aspect 8, further comprising: transmitting, to the second device, an indication to enable flow for the second data traffic based at least in part on the first amount of the first data traffic and the second data traffic stored in the one buffer being less than a second threshold level of the one buffer, wherein the second threshold level is associated with triggering the indication to enable flow for the second data traffic.

Aspect 10: The method of any of aspects 5 through 9, wherein the plurality of threshold levels include at least a first threshold level triggering transmission of the first flow control command for the first data traffic and a second threshold level triggering transmission of a second flow control command for the second data traffic, the first threshold level being less than the second threshold level.

Aspect 11: The method of any of aspects 1 through 10, wherein transmitting the first flow control command for the first data traffic comprises: transmitting the first flow control command based at least in part on a first amount of the first data traffic and the second data traffic stored in the one or more buffers being greater than a threshold level of the one or more buffers.

Aspect 12: The method of aspect 11, further comprising: receiving, from the second device, the second data traffic based at least in part on an exception of the second data traffic from the first flow control command; storing the second data traffic in the one or more buffers between the threshold level and an upper limit threshold level; and transmitting, to the second device, a second flow control command including an indication to stop transmitting the second data traffic based at least in part on a second amount of the second data traffic stored in the one or more buffers being equal to or greater than the upper limit threshold level.

Aspect 13: The method of any of aspects 1 through 12, further comprising: receiving, from a network device, one or more uplink grants for uplink transmission of the first data traffic and the second data traffic to the network device, wherein a size of a cumulation of the one or more uplink grants is less than a threshold size, the threshold size being a minimum size to concurrently carry both the first data traffic and the second data traffic without triggering a flow control command.

Aspect 14: The method of any of aspects 1 through 13, wherein the second data traffic has the second QoS based at least in part on an SLA associated with the second data traffic.

Aspect 15: The method of any of aspects 1 through 14, wherein the first data traffic and the second data traffic are associated with different DSCP classes.

Aspect 16: The method of any of aspects 1 through 15, wherein the first device is a modem of a UE and the second device is an application processor or a tethered client tethered to the first device via an ethernet connection, a USB connection, a PCIe connection, or a Wi-Fi connection.

Aspect 17: A method for wireless communication at a second device, comprising: transmitting, to a first device, a first data traffic having a first QoS and a first priority level; transmitting, to the first device, a second data traffic having a second QoS and a second priority level greater than the first priority level, wherein the first data traffic and the second data traffic are for a same radio bearer; receiving, from the first device, a first flow control command for the first data traffic based at least in part on the first priority level associated with the first data traffic being less than the second priority level and further based at least in part on a threshold level of a buffer of the one or more buffers; and transmitting, to the first device, the first data traffic and the second data traffic, the first data traffic transmitted according to the first flow control command.

Aspect 18: The method of aspect 17, wherein receiving the first flow control command for the first data traffic comprises: receiving the first flow control command for the first data traffic based at least in part on a first amount of the first data traffic stored in a first buffer associated with the first data traffic being greater than a first threshold level of the first buffer.

Aspect 19: The method of aspect 18, further comprising: receiving, from the first device, a second flow control command for the second data traffic based at least in part on a second amount of the second data traffic stored in a second buffer associated with the second data traffic being greater than a second threshold level of the second buffer, the second buffer being different from the first buffer.

Aspect 20: The method of aspect 19, wherein transmitting the first data traffic and the second data traffic comprises: transmitting, from the second device to the first device via a first interface, the first data traffic according to the first flow control command; and transmitting, from the second device to the first device via a second interface, the second data traffic according to the second flow control command.

Aspect 21: The method of any of aspects 19 through 20, wherein transmitting the first data traffic and the second data traffic comprises: transmitting, from the second device, the first data traffic according to a first traffic shaping based at least in part on the first flow control command; and transmitting, from the second device, the second data traffic according to a second traffic shaping based at least in part on the second flow control command.

Aspect 22: The method of aspect 17, wherein receiving the first flow control command for the first data traffic comprises: receiving the first flow control command for the first data traffic based at least in part on a first amount of the first data traffic and the second data traffic stored in one buffer of the first device being greater than a first threshold level of the one buffer, wherein the first threshold level of the one buffer is associated with triggering the first flow control command for the first data traffic.

Aspect 23: The method of aspect 22, further comprising: receiving, from the first device, an indication to enable flow for the first data traffic based at least in part on the first amount of the first data traffic and the second data traffic stored in the one buffer being less than a second threshold level of the one buffer, wherein the second threshold level of the one buffer is associated with triggering the indication to enable flow for the first data traffic.

Aspect 24: The method of any of aspects 17 through 23, further comprising: receiving, from the first device, a second flow control command for the second data traffic based at least in part on a first amount of the first data traffic and the second data traffic stored in one buffer of the first device being greater than a first threshold level of the one buffer, wherein the first threshold level of the one buffer is associated with triggering the second flow control command for the second data traffic.

Aspect 25: The method of aspect 24, further comprising: receiving, from the first device, an indication to enable flow for the second data traffic based at least in part on the first amount of the first data traffic and the second data traffic stored in the one buffer being less than a second threshold level of the one buffer, wherein the second threshold level of the one buffer is associated with triggering the indication to enable flow for the second data traffic.

Aspect 26: The method of any of aspects 17 through 25, wherein receiving the first flow control command comprises: receiving the first flow control command indicating that a first amount of the first data traffic and the second data traffic stored in the one or more buffers of the first device is greater than a threshold level of the one or more buffers.

Aspect 27: The method of aspect 26, further comprising: transmitting, to the first device, the second data traffic based at least in part on an exception of the second data traffic from the first flow control command; and receiving, from the first device, a second flow control command including an indication to stop transmitting the second data traffic based at least in part on a second amount of the second data traffic stored in the one or more buffers being equal to or greater than an upper limit threshold level of the one buffer.

Aspect 28: The method of any of aspects 17 through 27, further comprising: receiving an indication that a size of a cumulation of one or more uplink grants for uplink transmission of the first data traffic and the second data traffic is less than a threshold size, the threshold size being a minimum size to concurrently carry both the first data traffic and the second data traffic without triggering a flow control command.

Aspect 29: The method of aspect 28, wherein receiving the indication that the size of the cumulation of the one or more uplink grants for the uplink transmission is less than the threshold size comprises: receiving the indication that the one or more uplink grants are not available for the uplink transmission of the first data traffic and the second data traffic.

Aspect 30: The method of aspect 29, further comprising: receiving a second indication that the one or more uplink grants are available for the uplink transmission of the first data traffic and the second data traffic, wherein transmitting the first data traffic and the second data traffic to the first device comprises: transmitting the second data traffic prior to transmitting the first data traffic.

Aspect 31: The method of any of aspects 17 through 30, wherein the second data traffic has the second QoS based at least in part on an SLA associated with the second data traffic.

Aspect 32: The method of any of aspects 17 through 31, wherein the first data traffic and the second data traffic are associated with different DSCP classes.

Aspect 33: The method of any of aspects 17 through 32, wherein the first device is a modem of a UE and the second device is an application processor or a tethered client tethered to the first device via an ethernet connection, a USB connection, a PCIe connection, or a Wi-Fi connection.

Aspect 34: An apparatus for wireless communication at a first device, comprising a processor; memory coupled with the processor; and instructions stored in the memory and executable by the processor to cause the apparatus to perform a method of any of aspects 1 through 16.

Aspect 35: An apparatus for wireless communication at a first device, comprising at least one means for performing a method of any of aspects 1 through 16.

Aspect 36: A non-transitory computer-readable medium storing code for wireless communication at a first device, the code comprising instructions executable by a processor to perform a method of any of aspects 1 through 16.

Aspect 37: An apparatus for wireless communication at a second device, comprising a processor; memory coupled with the processor; and instructions stored in the memory and executable by the processor to cause the apparatus to perform a method of any of aspects 17 through 33.

Aspect 38: An apparatus for wireless communication at a second device, comprising at least one means for performing a method of any of aspects 17 through 33.

Aspect 39: A non-transitory computer-readable medium storing code for wireless communication at a second device, the code comprising instructions executable by a processor to perform a method of any of aspects 17 through 33.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device, comprising:
   receiving, from a second device, a first data traffic having a first quality of service and a first priority level;
   receiving, from the second device, a second data traffic having a second quality of service and a second priority level greater than the first priority level, wherein the first data traffic and the second data traffic are for a same radio bearer associated with a network device;
   receiving, from the network device, one or more uplink grants;
   storing the first data traffic and the second data traffic in one or more buffers of the first device;
   transmitting, to the second device, a first flow control command for the first data traffic and a second flow control command for the second data traffic based at least in part on the first priority level associated with the first data traffic being less than the second priority level and further based at least in part on a threshold level of a buffer of the one or more buffers and further based at least in part on a size of the one or more uplink grants, wherein the first flow control command indicates a first data rate for the first data traffic, and wherein the second flow control command indicates a second data rate for the second data traffic;
   receiving, from the second device, the first data traffic according to the first data rate;
   receiving, from the second device, the second data traffic according to the second data rate, wherein the second data rate is different from the first data rate; and
   transmitting, to the network device via the same radio bearer in accordance with the one or more uplink grants, the first data traffic based at least in part on the first data rate and the second data traffic based at least in part on the second data rate.

2. The method of claim 1, wherein storing the first data traffic and the second data traffic in the one or more buffers of the first device comprises:
   storing the first data traffic in a first buffer of the first device and the second data traffic in a second buffer of the first device, wherein the first buffer and the second buffer are linked to a same data radio bearer, and wherein each of the first buffer and the second buffer include a plurality of threshold levels that are each configured based at least in part on the first priority level and the second priority level.

3. The method of claim 2, wherein transmitting the first flow control command for the first data traffic comprises:
   transmitting the first flow control command for the first data traffic based at least in part on a first amount of the first data traffic stored in the first buffer being greater than a first threshold level of the first buffer.

4. The method of claim 2, wherein transmitting the second flow control command for the second data traffic comprises:
   transmitting the second flow control command for the second data traffic based at least in part on a second amount of the second data traffic stored in the second buffer being greater than a second threshold level of the second buffer.

5. The method of claim 1, wherein storing the first data traffic and the second data traffic in the one or more buffers of the first device comprises:
   storing the first data traffic and the second data traffic in one buffer of the first device, the one buffer including a plurality of threshold levels, wherein each threshold level of the plurality of threshold levels is configured based at least in part on the first priority level and the second priority level.

6. The method of claim 5, wherein transmitting the first flow control command for the first data traffic comprises:
   transmitting the first flow control command for the first data traffic based at least in part on a first amount of the first data traffic and the second data traffic stored in the one buffer being greater than a first threshold level of the one buffer, wherein the first threshold level is associated with triggering the first flow control command for the first data traffic.

7. The method of claim 6, further comprising:
   transmitting, to the second device, an indication to enable flow for the first data traffic based at least in part on the first amount of the first data traffic and the second data traffic stored in the one buffer being less than a second threshold level of the one buffer, wherein the second threshold level is associated with triggering the indication to enable flow for the first data traffic.

8. The method of claim 5, wherein transmitting the second flow control command for the second data traffic comprises:
   transmitting the second flow control command for the second data traffic based at least in part on a first amount of the first data traffic and the second data traffic stored in the one buffer being greater than a first threshold level of the one buffer, wherein the first threshold level is associated with triggering the second flow control command for the second data traffic.

9. The method of claim 8, further comprising:
   transmitting, to the second device, an indication to enable flow for the second data traffic based at least in part on the first amount of the first data traffic and the second data traffic stored in the one buffer being less than a second threshold level of the one buffer, wherein the second threshold level is associated with triggering the indication to enable flow for the second data traffic.

10. The method of claim 5, wherein the plurality of threshold levels includes at least a first threshold level triggering transmission of the first flow control command for the first data traffic and a second threshold level triggering transmission of the second flow control command for the second data traffic, the first threshold level being less than the second threshold level.

11. The method of claim 1, wherein transmitting the first flow control command for the first data traffic comprises:
   transmitting the first flow control command based at least in part on a first amount of the first data traffic and the second data traffic stored in the one or more buffers being greater than the threshold level of the buffer of the one or more buffers.

12. The method of claim 11, further comprising:
receiving, from the second device, the second data traffic based at least in part on an exception of the second data traffic from the first flow control command; and
storing the second data traffic in the one or more buffers between the threshold level and an upper limit threshold level,
wherein transmitting the second flow control command comprises transmitting an indication to stop transmitting the second data traffic based at least in part on a second amount of the second data traffic stored in the one or more buffers being equal to or greater than the upper limit threshold level.

13. The method of claim 1,
wherein the size of the one or more uplink grants is less than a threshold size, the threshold size being a minimum size to concurrently carry both the first data traffic and the second data traffic without triggering a flow control command.

14. The method of claim 1, wherein the first device is a modem of a user equipment (UE) and the second device is an application processor or a tethered client tethered to the first device via an ethernet connection, a universal serial bus (USB) connection, a peripheral component interconnect express (PCIe) connection, or a wireless fidelity (Wi-Fi) connection.

15. A method for wireless communication at a second device, comprising:
transmitting, to a first device, a first data traffic having a first quality of service and a first priority level;
transmitting, to the first device, a second data traffic having a second quality of service and a second priority level greater than the first priority level, wherein the first data traffic and the second data traffic are for a same radio bearer at the first device;
receiving, from the first device, a first flow control command for the first data traffic and a second flow control command for the second data traffic, the first flow control command and the second flow control command received based at least in part on the first priority level associated with the first data traffic being less than the second priority level and further based at least in part on a threshold level of a buffer of one or more buffers of the first device and further based at least in part on a size of one or more uplink grants for uplink transmission at the first device of the first data traffic and the second data traffic, wherein the first flow control command indicates a first data rate for the first data traffic, and wherein the second flow control command indicates a second data rate for the second data traffic;
transmitting, to the first device, the first data traffic according to the first data rate; and
transmitting, to the first device, the second data traffic according to the second data rate, wherein the second data rate is different from the first data rate.

16. The method of claim 15, wherein receiving the first flow control command for the first data traffic comprises:
receiving the first flow control command for the first data traffic based at least in part on a first amount of the first data traffic stored in a first buffer associated with the first data traffic being greater than a first threshold level of the first buffer.

17. The method of claim 16, wherein receiving the second flow control command for the second data traffic comprises:
receiving the second flow control command for the second data traffic based at least in part on a second amount of the second data traffic stored in a second buffer associated with the second data traffic being greater than a second threshold level of the second buffer, the second buffer being different from the first buffer.

18. The method of claim 15, wherein transmitting the first data traffic and the second data traffic comprises:
transmitting, from the second device to the first device via a first interface, the first data traffic according to the first flow control command; and
transmitting, from the second device to the first device via a second interface, the second data traffic according to the second flow control command.

19. The method of claim 15, wherein transmitting the first data traffic and the second data traffic comprises:
transmitting, from the second device, the first data traffic according to a first traffic shaping based at least in part on the first flow control command; and
transmitting, from the second device, the second data traffic according to a second traffic shaping based at least in part on the second flow control command.

20. The method of claim 15, wherein receiving the first flow control command for the first data traffic comprises:
receiving the first flow control command for the first data traffic based at least in part on a first amount of the first data traffic and the second data traffic stored in one buffer of the first device being greater than a first threshold level of the one buffer, wherein the first threshold level of the one buffer is associated with triggering the first flow control command for the first data traffic.

21. The method of claim 20, further comprising:
receiving, from the first device, an indication to enable flow for the first data traffic based at least in part on the first amount of the first data traffic and the second data traffic stored in the one buffer being less than a second threshold level of the one buffer, wherein the second threshold level of the one buffer is associated with triggering the indication to enable flow for the first data traffic.

22. The method of claim 15, wherein receiving the second flow control command for the second data traffic comprises:
receiving the second flow control command for the second data traffic based at least in part on a first amount of the first data traffic and the second data traffic stored in one buffer of the first device being greater than a first threshold level of the one buffer, wherein the first threshold level of the one buffer is associated with triggering the second flow control command for the second data traffic.

23. The method of claim 22, further comprising:
receiving, from the first device, an indication to enable flow for the second data traffic based at least in part on the first amount of the first data traffic and the second data traffic stored in the one buffer being less than a second threshold level of the one buffer, wherein the second threshold level of the one buffer is associated with triggering the indication to enable flow for the second data traffic.

24. The method of claim 15, wherein receiving the first flow control command comprises:
receiving the first flow control command indicating that a first amount of the first data traffic and the second data traffic stored in the one or more buffers of the first device is greater than the threshold level of the buffer of the one or more buffers.

25. The method of claim 24, further comprising:
transmitting, to the first device, the second data traffic based at least in part on an exception of the second data traffic from the first flow control command,
wherein receiving the second flow control command comprises receiving an indication to stop transmitting the second data traffic based at least in part on a second amount of the second data traffic stored in the one or more buffers being equal to or greater than an upper limit threshold level.

26. The method of claim 15, further comprising:
receiving an indication that the size of the one or more uplink grants is less than a threshold size, the threshold size being a minimum size to concurrently carry both the first data traffic and the second data traffic without triggering a flow control command.

27. The method of claim 26, wherein receiving the indication that the size of the one or more uplink grants is less than the threshold size comprises:
receiving an indication that the one or more uplink grants are not available for the uplink transmission of the first data traffic and the second data traffic.

28. The method of claim 27, further comprising:
receiving a second indication that the one or more uplink grants are available for the uplink transmission of the first data traffic and the second data traffic, wherein transmitting the first data traffic and the second data traffic to the first device comprises:
transmitting the second data traffic prior to transmitting the first data traffic.

29. An apparatus for wireless communication at a first device, comprising:
a processor;
memory coupled with the processor; and
instructions stored in the memory and executable by the processor to cause the apparatus to:
receive, from a second device, a first data traffic having a first quality of service and a first priority level;
receive, from the second device, a second data traffic having a second quality of service and a second priority level greater than the first priority level, wherein the first data traffic and the second data traffic are for a same radio bearer associated with a network device;
receive, from the network device, one or more uplink grants;
store the first data traffic and the second data traffic in one or more buffers of the first device;
transmit, to the second device, a first flow control command for the first data traffic and a second flow control command for the second data traffic based at least in part on the first priority level associated with the first data traffic being less than the second priority level and further based at least in part on a threshold level of a buffer of the one or more buffers and further based at least in part on a size of the one or more uplink grants, wherein the first flow control command indicates a first data rate for the first data traffic, and wherein the second flow control command indicates a second data rate for the second data traffic;
receive, from the second device, the first data traffic according to the first data rate;
receive, from the second device, the second data traffic according to the second data rate, wherein the second data rate is different from the first data rate; and
transmit to the network device via the same radio bearer in accordance with the one or more uplink grants, the first data traffic based at least in part on the first data rate and the second data traffic based at least in part on the second data rate.

30. An apparatus for wireless communication at a second device, comprising:
a processor;
memory coupled with the processor; and
instructions stored in the memory and executable by the processor to cause the apparatus to:
transmit, to a first device, a first data traffic having a first quality of service and a first priority level;
transmit, to the first device, a second data traffic having a second quality of service and a second priority level greater than the first priority level, wherein the first data traffic and the second data traffic are for a same radio bearer at the first device;
receive, from the first device, a first flow control command for the first data traffic and a second flow control command for the second data traffic, the first flow control command and the second flow control command received based at least in part on the first priority level associated with the first data traffic being less than the second priority level and further based at least in part on a threshold level of a buffer of one or more buffers of the first device and further based at least in part on a size of one or more uplink grants for uplink transmission at the first device of the first data traffic and the second data traffic, wherein the first flow control command indicates a first data rate for the first data traffic, and wherein the second flow control command indicates a second data rate for the second data traffic;
transmit, to the first device, the first data traffic according to the first data rate; and
transmit, to the first device, the second data traffic according to the second data rate, wherein the second data rate is different from the first data rate.

* * * * *